United States Patent
Donahue et al.

(10) Patent No.: US 11,636,822 B2
(45) Date of Patent: Apr. 25, 2023

(54) SYSTEMS AND METHODS FOR IDENTIFYING THREATS AND LOCATIONS, SYSTEMS AND METHOD FOR AUGMENTING REAL-TIME DISPLAYS DEMONSTRATING THE THREAT LOCATION, AND SYSTEMS AND METHODS FOR RESPONDING TO THREATS

(71) Applicant: TELEDYNE FLIR DETECTION, INC., Stillwater, OK (US)

(72) Inventors: Scott Donahue, Allison Park, PA (US); Jeremy P. Walker, Oakmont, PA (US); Jessica L. Milke, Irwin, PA (US); Jason Robosky, Pittsburgh, PA (US)

(73) Assignee: TELEDYNE FLIR DETECTION, INC., Stillwater, OK (US)

( * ) Notice: Subject to any disclaimer, the term of this patent is extended or adjusted under 35 U.S.C. 154(b) by 0 days.

(21) Appl. No.: 16/534,890

(22) Filed: Aug. 7, 2019

(65) Prior Publication Data
US 2020/0125890 A1     Apr. 23, 2020

Related U.S. Application Data

(63) Continuation-in-part of application No. PCT/US2018/017269, filed on Feb. 7, 2018.
(Continued)

(51) Int. Cl.
*G09G 5/00* (2006.01)
*G06T 7/10* (2017.01)
(Continued)

(52) U.S. Cl.
CPC ............... *G09G 5/00* (2013.01); *G06T 7/10* (2017.01); *G06T 11/00* (2013.01); *G06T 11/60* (2013.01);
(Continued)

(58) Field of Classification Search
None
See application file for complete search history.

(56) References Cited

U.S. PATENT DOCUMENTS

| 7,383,129 B1 | 6/2008 | Baillot et al. |
| 8,394,329 B2 | 3/2013 | Jaworski et al. |

(Continued)

FOREIGN PATENT DOCUMENTS

| EP | 2053384 A1 | 4/2009 |
| EP | 2402906 A2 | 1/2012 |

(Continued)

OTHER PUBLICATIONS

Examination report for GB Application No. 2209120.1 dated Dec. 6, 2022, 8 pages.
(Continued)

*Primary Examiner* — Jwalant Amin
(74) *Attorney, Agent, or Firm* — K&L Gates LLP

(57) ABSTRACT

Systems for identifying threat materials such as CBRNE threats and locations are provided. The systems can include a data acquisition component configured to determine the presence of a CBRNE threat; data storage media; and processing circuitry operatively coupled to the data acquisition device and the storage media. Methods for identifying a CBRNE threat are provided. The methods can include: determining the presence of a CBRNE threat using a data acquisition component; and acquiring an image while determining the presence of the CBRNE threat. Methods for augmenting a real-time display to include the location and/or type of CBRNE threat previously identified are also provided. Methods for identifying and responding to CBRNE threats are provided as well.

28 Claims, 33 Drawing Sheets
(27 of 33 Drawing Sheet(s) Filed in Color)

Related U.S. Application Data

(60) Provisional application No. 62/456,007, filed on Feb. 7, 2017.

(51) Int. Cl.
  G06T 11/00 (2006.01)
  H04N 5/77 (2006.01)
  G06T 11/60 (2006.01)
  G06V 10/22 (2022.01)
  G06V 10/75 (2022.01)

(52) U.S. Cl.
  CPC .......... *G06V 10/225* (2022.01); *G06V 10/758* (2022.01); *H04N 5/77* (2013.01); *G06T 2207/10016* (2013.01); *G06T 2207/20212* (2013.01); *G06T 2207/20221* (2013.01); *G09G 2340/10* (2013.01); *G09G 2340/12* (2013.01)

(56) References Cited

U.S. PATENT DOCUMENTS

| | | | |
|---|---|---|---|
| 8,545,683 | B2 | 10/2013 | Tao et al. |
| 8,953,841 | B1 | 2/2015 | Leblang et al. |
| 9,363,425 | B2 | 6/2016 | Black |
| 9,412,205 | B2 | 8/2016 | Mullins et al. |
| 9,606,992 | B2 | 3/2017 | Geisner et al. |
| 10,042,078 | B2* | 8/2018 | Sarraiocco ......... G06K 9/00771 |
| 10,846,924 | B2 | 11/2020 | Shore |
| 11,092,507 | B2 | 8/2021 | Ekeroth |
| 11,488,369 | B2 | 11/2022 | Donahue et al. |
| 2002/0098508 | A1* | 7/2002 | Williams ............ C12Q 1/6827 435/6.11 |
| 2003/0210228 | A1 | 11/2003 | Ebersole et al. |
| 2007/0070069 | A1 | 3/2007 | Samarasekera et al. |
| 2008/0210859 | A1* | 9/2008 | Tolley ................ H01J 49/4235 250/282 |
| 2008/0240578 | A1 | 10/2008 | Gudmundson et al. |
| 2009/0167511 | A1* | 7/2009 | Strombeck ............ G08B 25/08 340/425.5 |
| 2012/0001901 | A1* | 1/2012 | Park ..................... G06T 7/593 345/419 |
| 2012/0122491 | A1* | 5/2012 | Kim ..................... H04L 67/22 455/456.3 |
| 2012/0194419 | A1 | 8/2012 | Osterhout et al. |
| 2012/0229302 | A1* | 9/2012 | Sri-Jayantha ........ G08G 1/0112 340/905 |
| 2012/0296567 | A1* | 11/2012 | Breed ................... G01C 21/26 701/468 |
| 2012/0299702 | A1* | 11/2012 | Edara .................... G01S 19/49 340/8.1 |
| 2013/0034268 | A1 | 2/2013 | Perron |
| 2013/0113939 | A1* | 5/2013 | Strandemar ...... H04N 5/232933 348/164 |
| 2013/0282345 | A1 | 10/2013 | McCulloch et al. |
| 2013/0293586 | A1 | 11/2013 | Kaino et al. |
| 2015/0109338 | A1 | 4/2015 | McKinnon et al. |
| 2015/0235474 | A1 | 8/2015 | Mullins |
| 2016/0022375 | A1 | 1/2016 | Blake et al. |
| 2016/0055671 | A1 | 2/2016 | Menozzi et al. |
| 2016/0217590 | A1 | 7/2016 | Mullins |
| 2016/0247318 | A2 | 8/2016 | Menozzi et al. |
| 2016/0354812 | A1 | 12/2016 | Sovesky et al. |
| 2017/0017860 | A1* | 1/2017 | Piatrou ................... G06K 9/48 |
| 2017/0148183 | A1 | 5/2017 | Saitwal et al. |
| 2017/0154438 | A1 | 6/2017 | Kisner et al. |
| 2018/0318889 | A1 | 11/2018 | Sovesky et al. |
| 2019/0041373 | A1 | 2/2019 | Park et al. |
| 2019/0073536 | A1 | 3/2019 | Jha |
| 2019/0086296 | A1 | 3/2019 | West |
| 2020/0302168 | A1* | 9/2020 | Vo ......................... G06K 9/6217 |
| 2021/0056694 | A1 | 2/2021 | Schafer |

FOREIGN PATENT DOCUMENTS

| | | |
|---|---|---|
| WO | WO 2003/054824 A2 | 7/2003 |
| WO | WO PCT/US2018/017269 | 6/2018 |
| WO | WO PCT/US2018/017269 | 8/2019 |

OTHER PUBLICATIONS

Combined Search and Examination Report for GB Application No. 2209120.1 dated Jul. 12, 2022, 9 pages.

Search report for GB Application No. 1911082.4 dated Aug. 3, 2022, 8 pages.

International Search Report and Written Opinion for International Application No. PCT/US2022/073343 dated Nov. 3, 2022.

Kangas et al., Colorimetric Sensor Arrays for the Detection and Identification of Chemical Weapons and Explosives, Nov. 1, 2016, accessed from https://doi.org/10.1080/10408347.2016.1233805.

Davidson et al., Detection of Chemical Warfare Agents by Colorimetric Sensor Arrays, ACS Sensors, 2020, 5, pp. 1102-1109. Accessed from https://dx.doi.org/10.1021/acssensors.Oc00042.

Ronneberger et al., U-Net: Convolutional Networks for Biomedical Image Segmentation, May 18, 2015, pp. 1-8.

"Common Objects in Context" retrieved Jun. 30. 2021, 1 page. Accessed from https://cocodataset.org/#home.

Segmentation Models with Pretrained Backbones. PyTorch, retrieved Jun. 30, 2021, 4 pages. Accessed from https://github.com/qubvel/segmentation models_pytorch.

Yang et al. Multi-Temporal Remote Sensing Image Registration Using Deep Convolutional Features, IEEE Access, vol. 6, Jul. 30, 2018, pp. 38544-38555.

Zeng et al., Rethinking Planar Homography Estimation Using Perspective Fields, 2019, 17 pages.

ROS (Robot Operating System), accessed Nov. 30, 2022 from https://www.ros.org/.

Brickstream 3D Gen 2, accessed Nov. 30, 2022 from https://www.flir.com/products/brickstream-3d-gen2/?vertical=people%20counting&segment=iis.

Examination report for GB Application No. 2209120.1 dated Feb. 7, 2023, 5 pages.

Jasiobedzki et al., C2SM: a mobile system for detecting and 3D mapping of chemical, radiological, and nuclear contamination. Proc. SPIE 7305, Sensors, and Command, Control, Communications, and Intelligence (C3I) Technologies for Homeland Security and Homeland Defense VIII, May 5, 2009. Abstract only.

Jasiobedzki et al., 3D modeling of environments contaminated with chemical, biological, radiological and nuclear (CBRN) agents, Proceedings of SPIE—The International Society for Optical Engineering, May 2008. Abstract only.

Pollefeys et al., Hand-held acquisition of 3D models with a video camera, Second International Conference on 3-D Digital Imaging and Modeling (Cat. No. PR00062), Ottawa, ON, Canada, 1999, pp. 14-23.

Se et al., Photo-realistic 3D model reconstruction, Proceedings 2006 IEEE International Conference on Robotics and Automation, 2006, Orlando, FL, 2006, pp. 3076-3082.

* cited by examiner

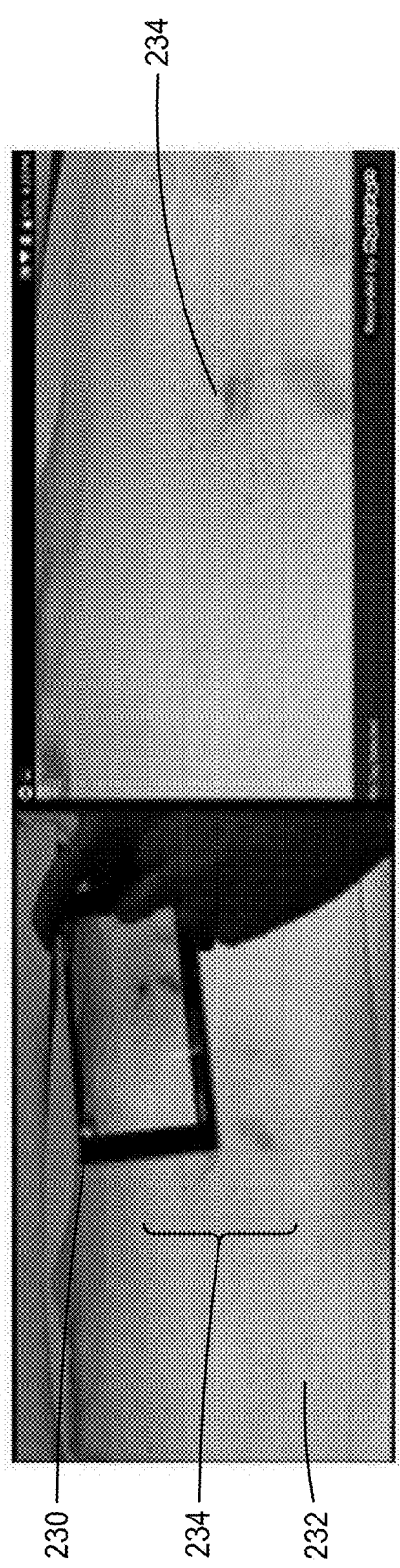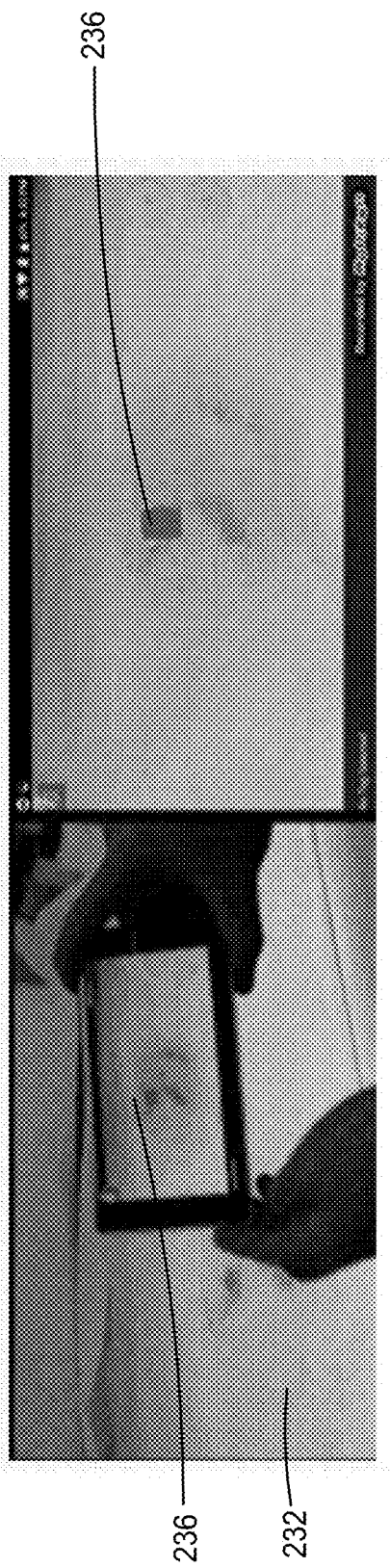
FIG. 26A  FIG. 26B  FIG. 27A  FIG. 27B

- Event Notification
- App Platform
- AR Imaging

SYSTEMS AND METHODS FOR IDENTIFYING THREATS AND LOCATIONS, SYSTEMS AND METHOD FOR AUGMENTING REAL-TIME DISPLAYS DEMONSTRATING THE THREAT LOCATION, AND SYSTEMS AND METHODS FOR RESPONDING TO THREATS

CROSS REFERENCE TO RELATED APPLICATION

This application is a Continuation-In-Part of PCT Patent Application Serial No. PCT/US2018/017269 filed Feb. 7, 2018, entitled "Systems and Methods for Identifying Threats and Locations, Systems and Method for Augmenting Real-Time Displays Demonstrating the Threat Location, and Systems and Methods for Responding to Threats", which claims priority to U.S. Provisional Patent Application Ser. No. 62/456,007 filed Feb. 7, 2017, entitled "Personal Imaging Device for Detecting and Confirming Threat with Mapping and Augmented Recall Capability", the entirety of each of which is incorporated by reference herein.

TECHNICAL FIELD

The present disclosure relates to threat material detection such as CBRNE threat detection, identification, image augmenting to reflect CBRNE threats, mapping and networks to provide same.

BACKGROUND

Personnel deal with weapons of mass destruction (WMD) CBRNE and chemical, biological, radiological, nuclear and explosive (CBRNE) threats such as IED's, nerve CBRNEs, opioids, etc. throughout our society at almost all levels. Warfighters and first responders seemingly are consistently put in situations wherein knowledge of the presence of these threats or past presence would be extraordinarily beneficial. The present disclosure provides systems for identifying and mapping CBRNE-WMD or CBRNE threats and locations as well as augmenting real-time displays to display the location and/or type of CBRNE threat, as well as methods for decontaminating materials and personnel that have been identified as exposed to CBRNE threats.

SUMMARY

Systems for identifying threat materials such as a CBRNE threat and locations are provided. The system can include a data acquisition component configured to determine the presence of threat material; data storage media; and processing circuitry operatively coupled to the data acquisition device and the storage media, the processing circuitry configured to display real-time images depicting a location of threat material determined by the data acquisition component.

Methods for identifying threat material such as CBRNE threat are provided. The methods can include: determining the presence of a threat material using a data acquisition component; acquiring an image while determining the presence of the threat material; associating the location of the presence of the threat material with a portion of the acquired image; altering the image to depict the location of the threat material; and displaying the image depicting the location of the threat material.

Methods for augmenting a real-time display to include the location and/or type of threat materials such as a CBRNE threat previously identified are also provided. The methods can include: acquiring an image and storing the image on storage media; augmenting the image upon determining the presence of threat materials; and storing the augmented image on the storage media.

Methods for identifying and responding to threat materials such as CBRNE threats are provided as well. The methods can include: acquiring an image; processing the image to tag one or more features of the image to prepare a tagged image using processing circuitry; and detecting threat material and associating the threat material with the tagged image using processing circuitry.

DRAWINGS

The patent or application file contains at least one drawing executed in color. Copies of this patent or patent application publication with color drawing(s) will be provided by the Office upon request and payment of the necessary fee.

Embodiments of the disclosure are described below with reference to the following accompanying drawings.

Figure 10A:
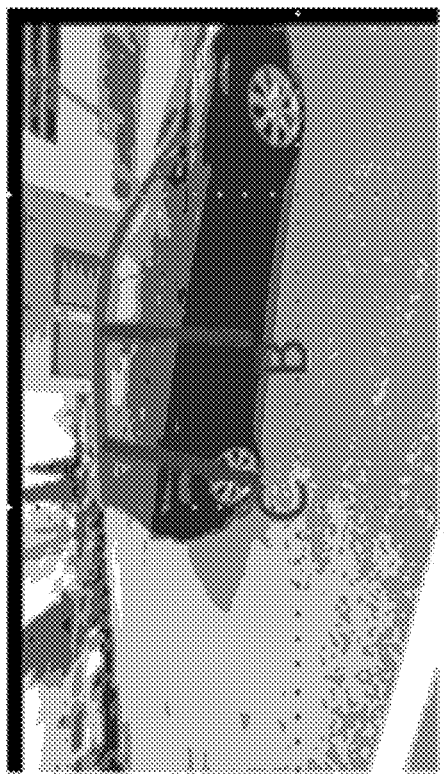
Figure 10B:
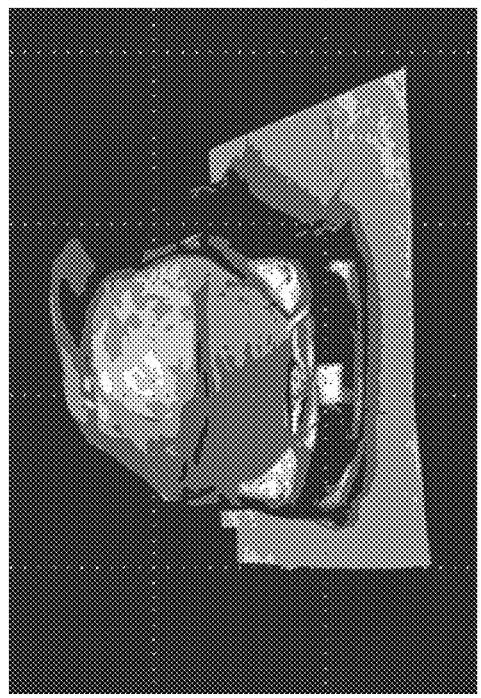
Figure 10C:
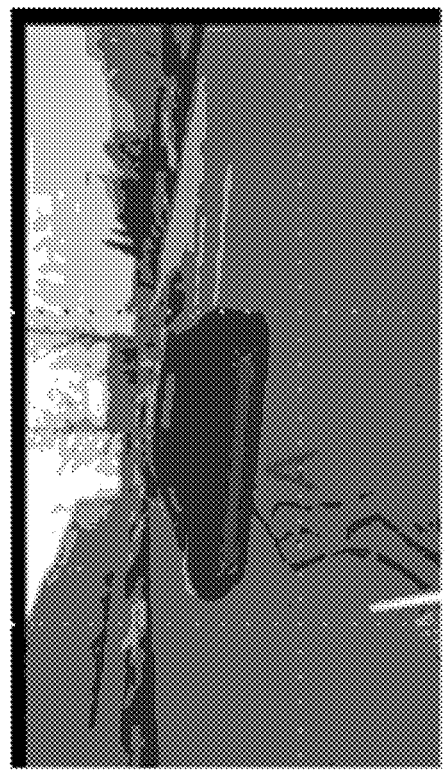

FIGS. 10A-C are actual images for processing according to an embodiment of the disclosure.

Figure 10D:
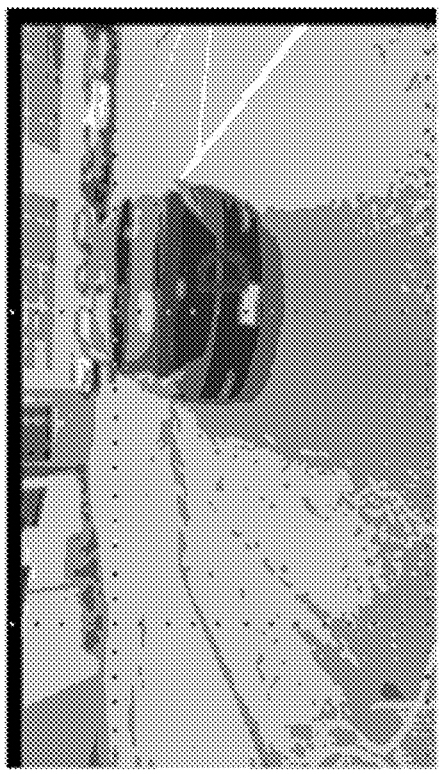

FIG. 10D is a processed image from the images of 10A-C according to an embodiment of the disclosure.

Figure 11:
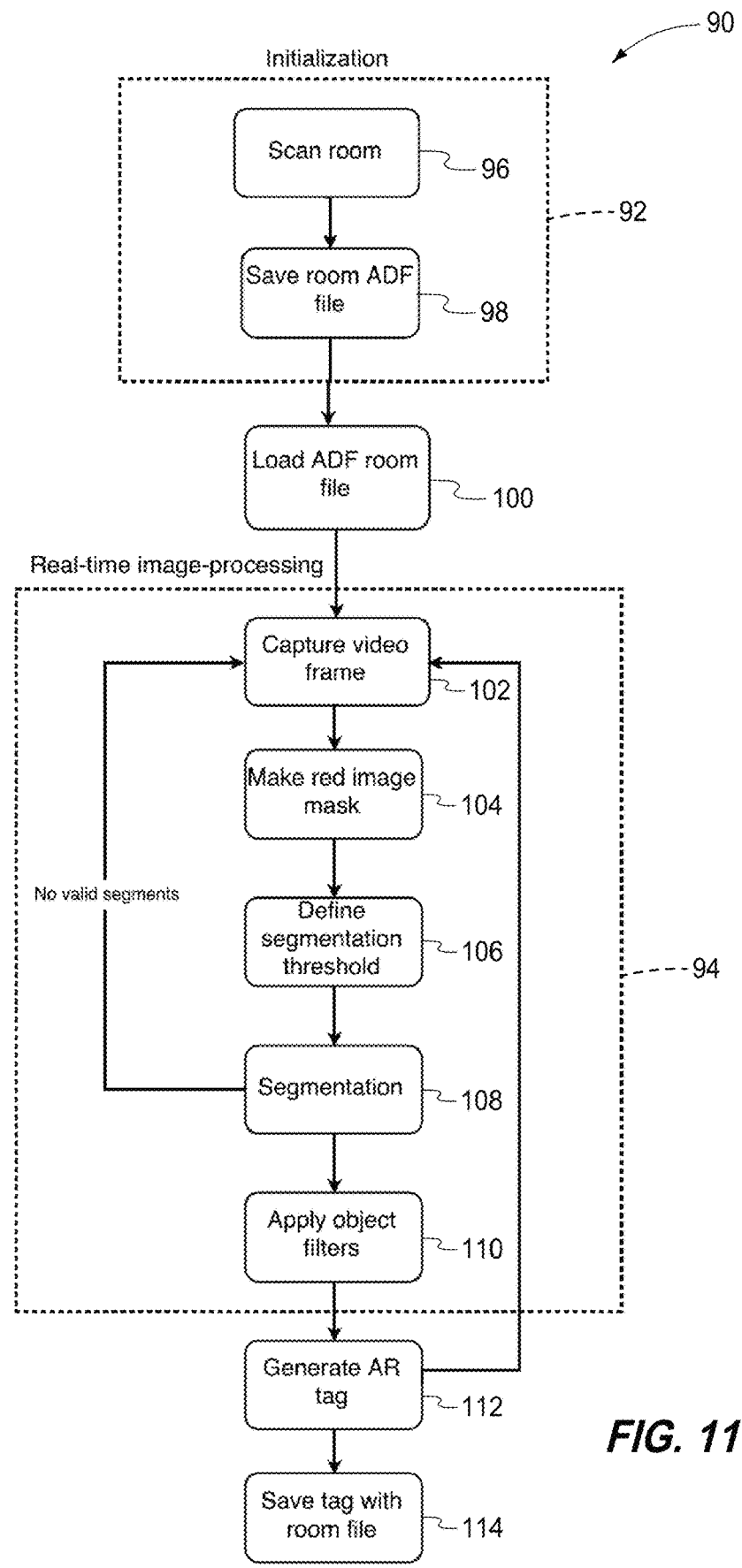

FIG. 11 is a process for processing images according to an embodiment of the disclosure.

Figure 12:
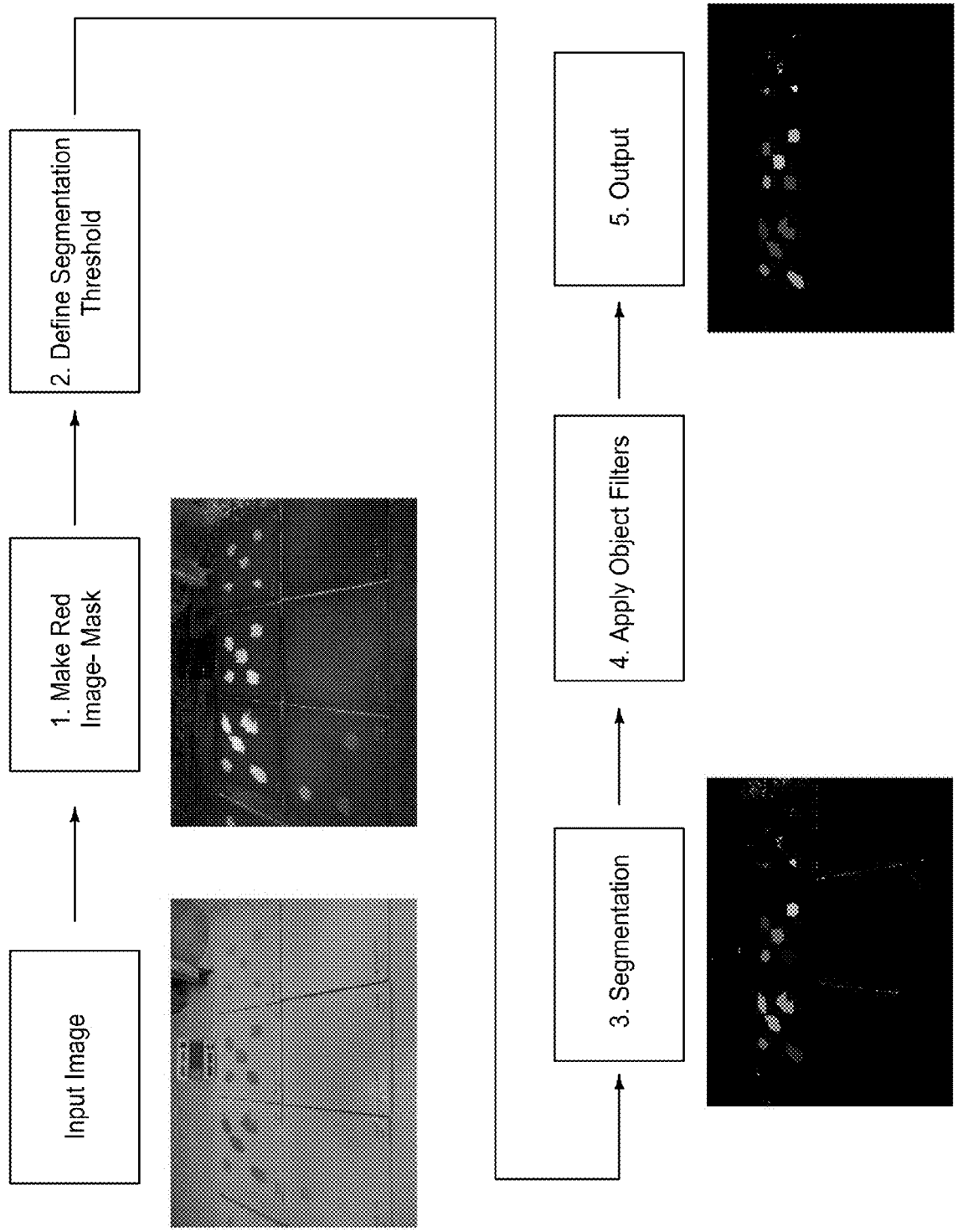

FIG. 12 is a process for detecting threat materials such as a CBRNE threat using acquired images and processing same.

Figure 13:
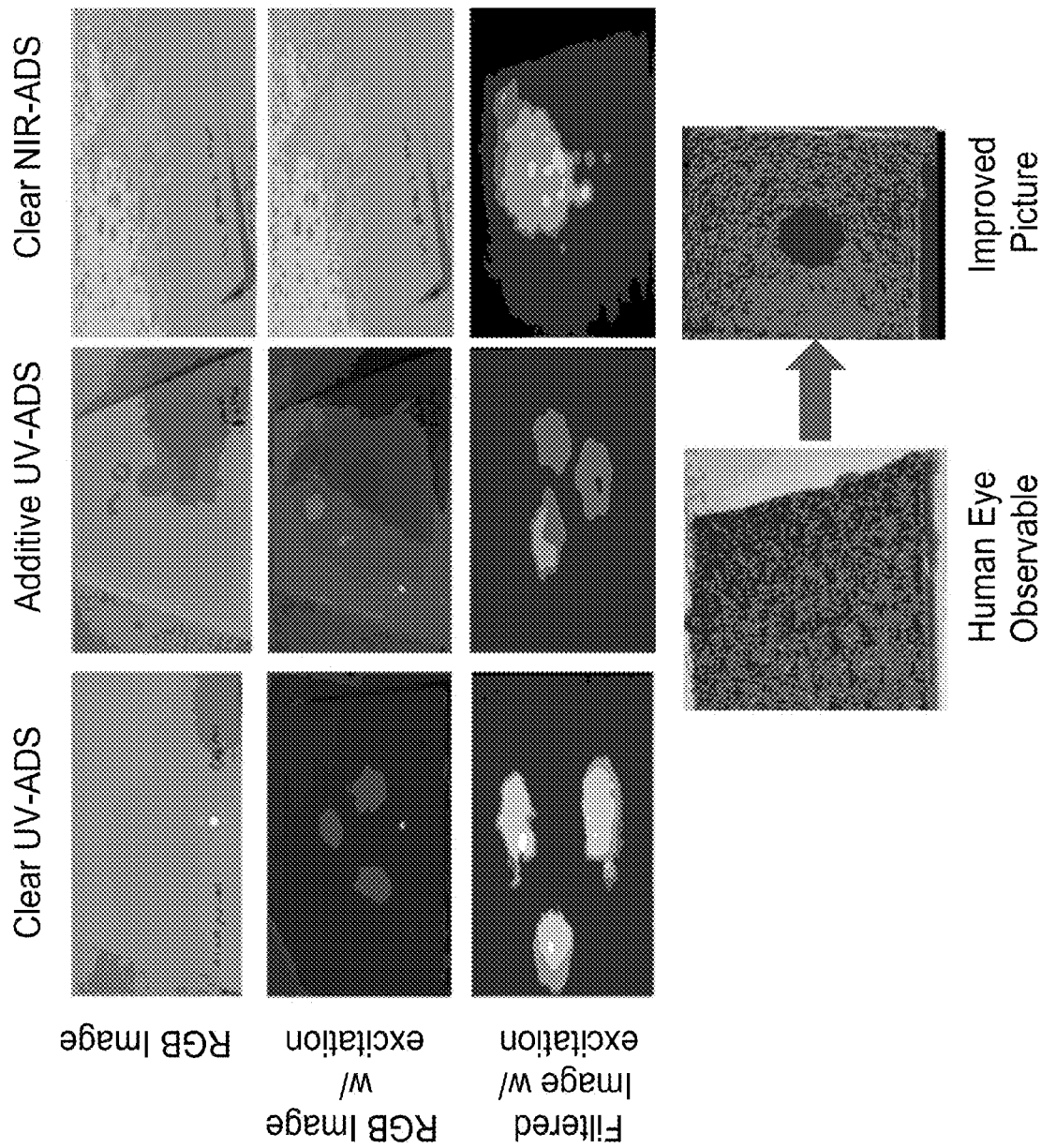

FIG. 13 is a series of masked and unmasked images according to an embodiment of the disclosure.

Figure 14:
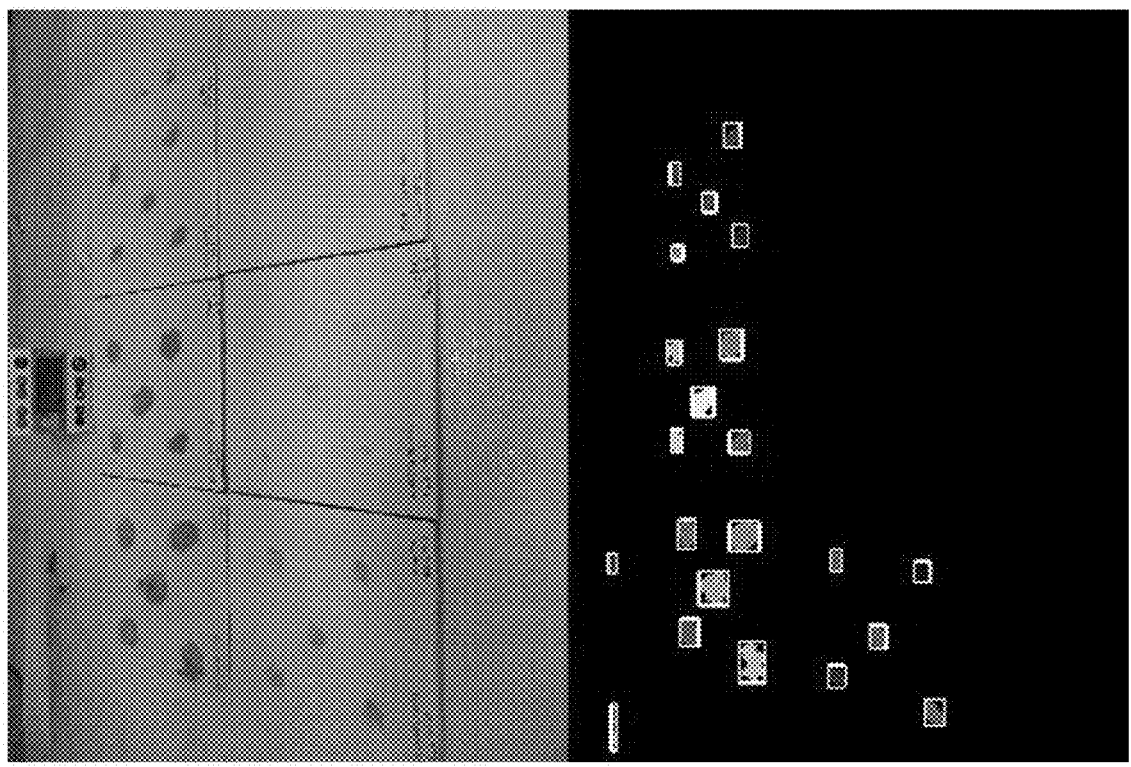

FIG. 14 is a depiction of augmented imagery according to an embodiment of the disclosure.

Figure 15:
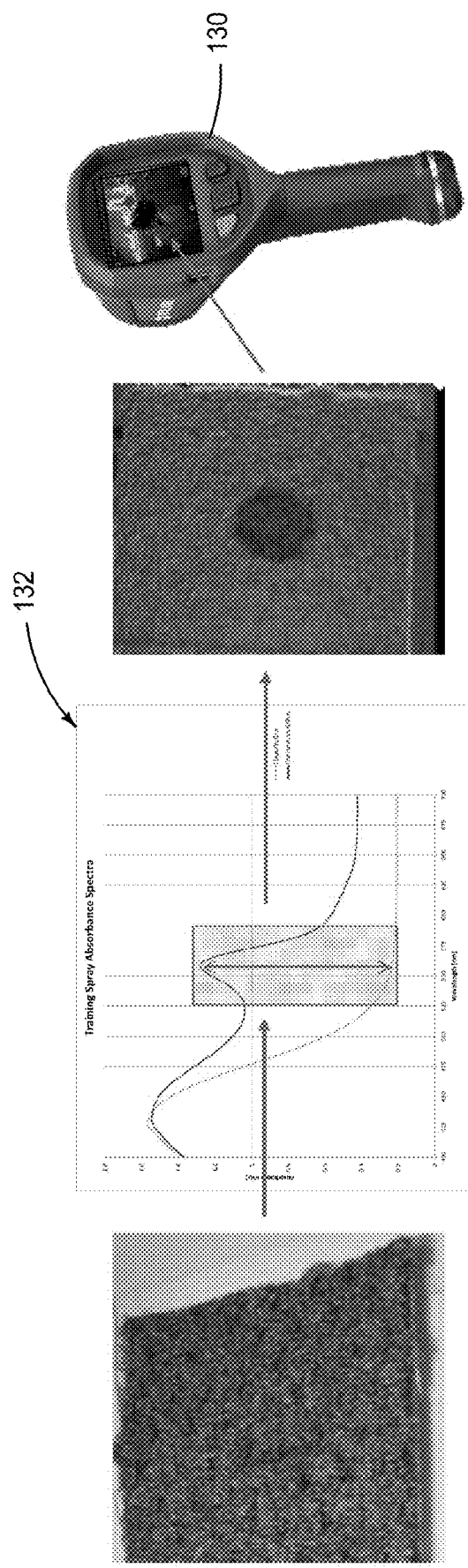

FIG. 15 is a depiction of CBRNE threat detection according to an embodiment of the disclosure.

Figure 16:
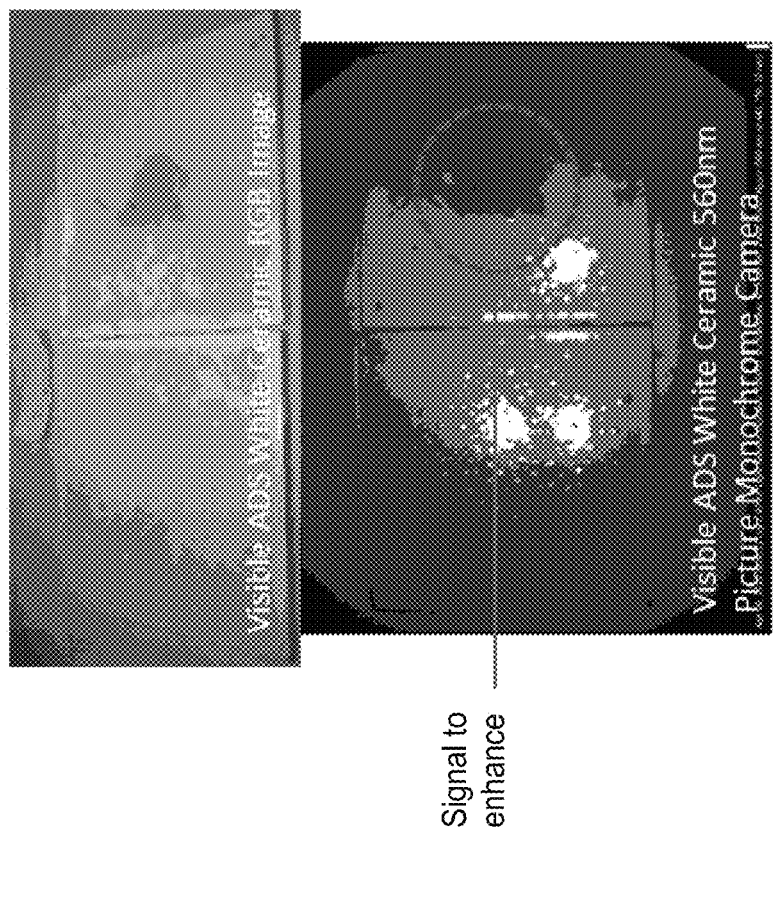
Figure 16:
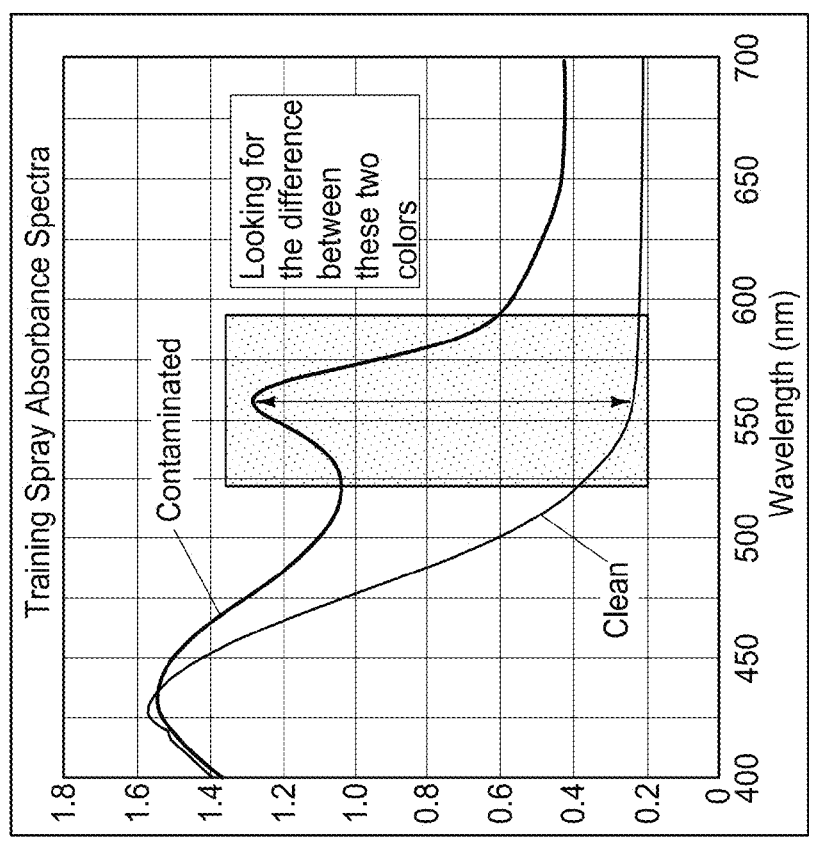

FIG. 16 is another depiction of CBRNE threat detection according to an embodiment of the disclosure.

Figure 17:
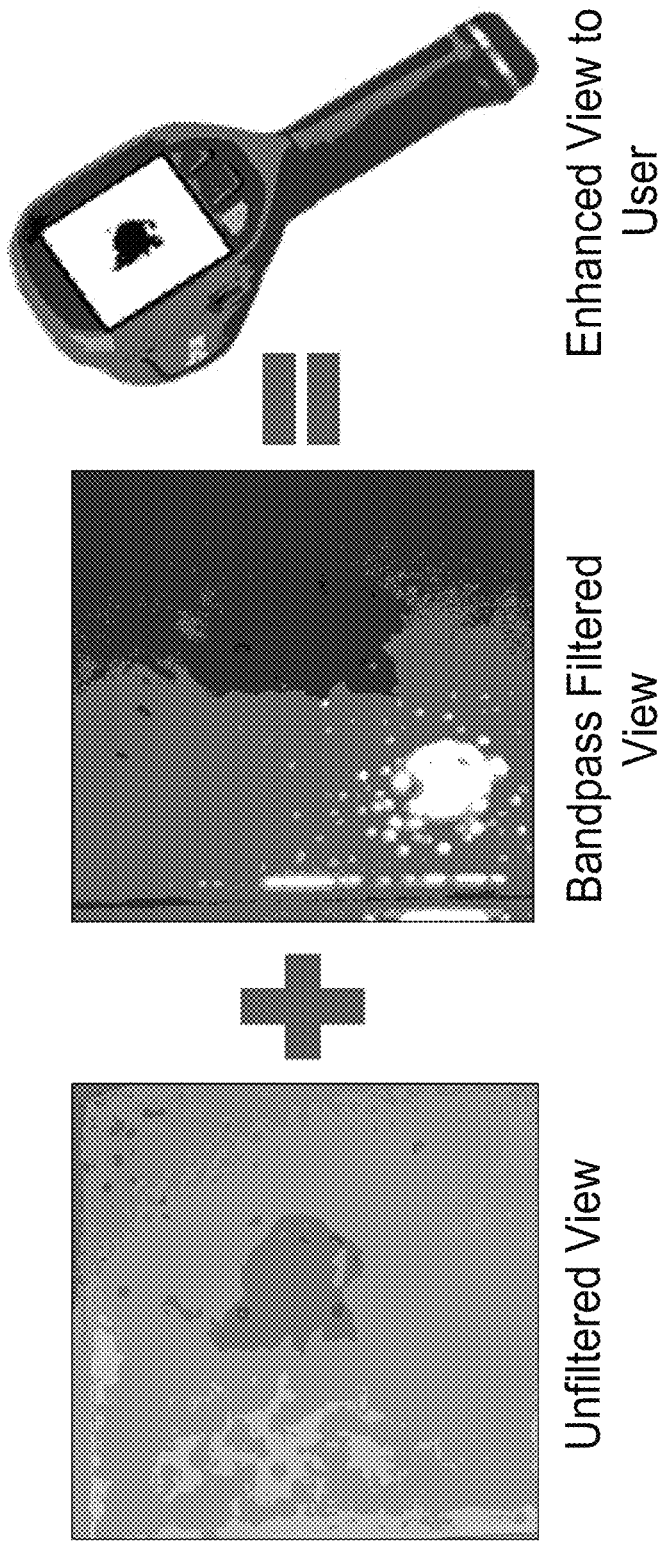

FIG. 17 is a depiction of augmented imagery used to detect a CBRNE threat according to an embodiment of the disclosure.

Figure 18:
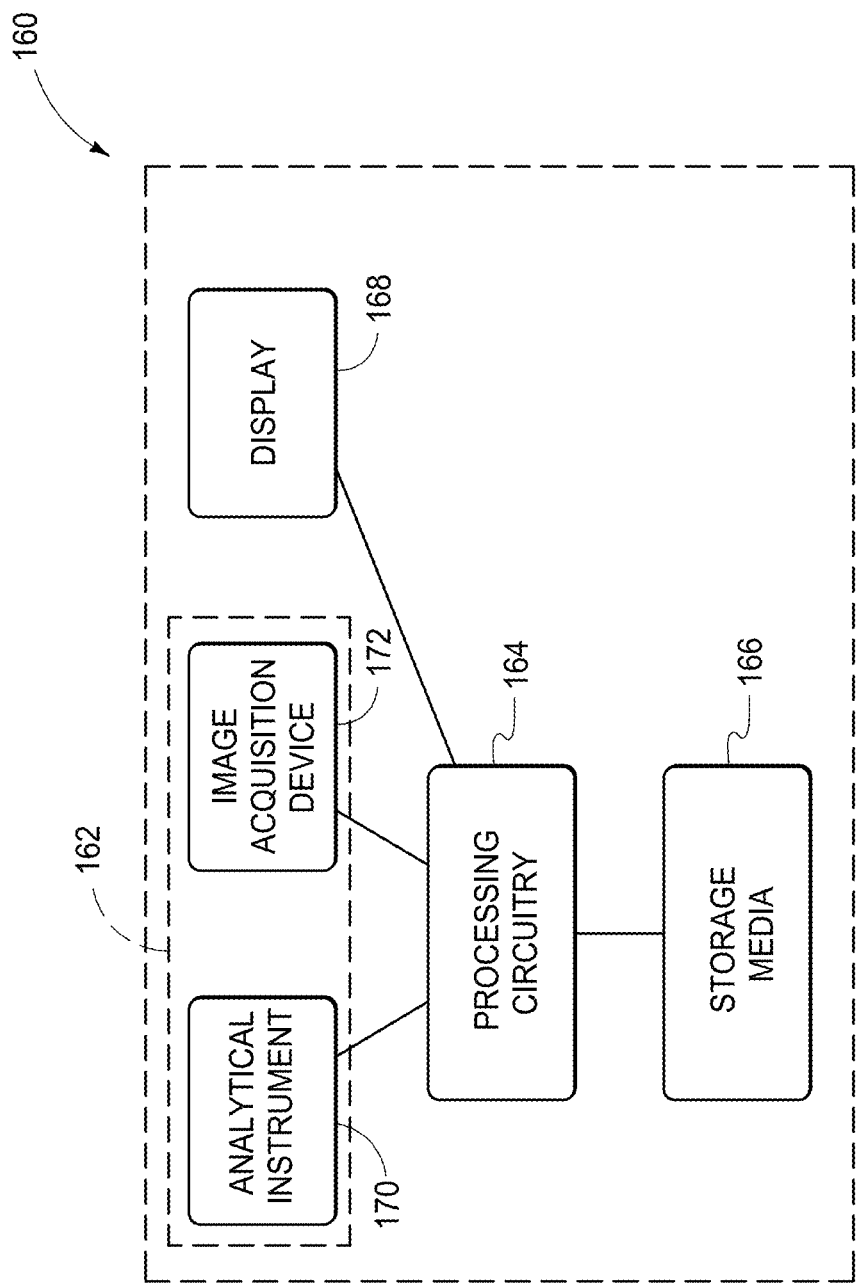

FIG. 18 is a depiction of a system for identifying threat materials such as CBRNE threats according to an embodiment of the disclosure.

Figure 19:
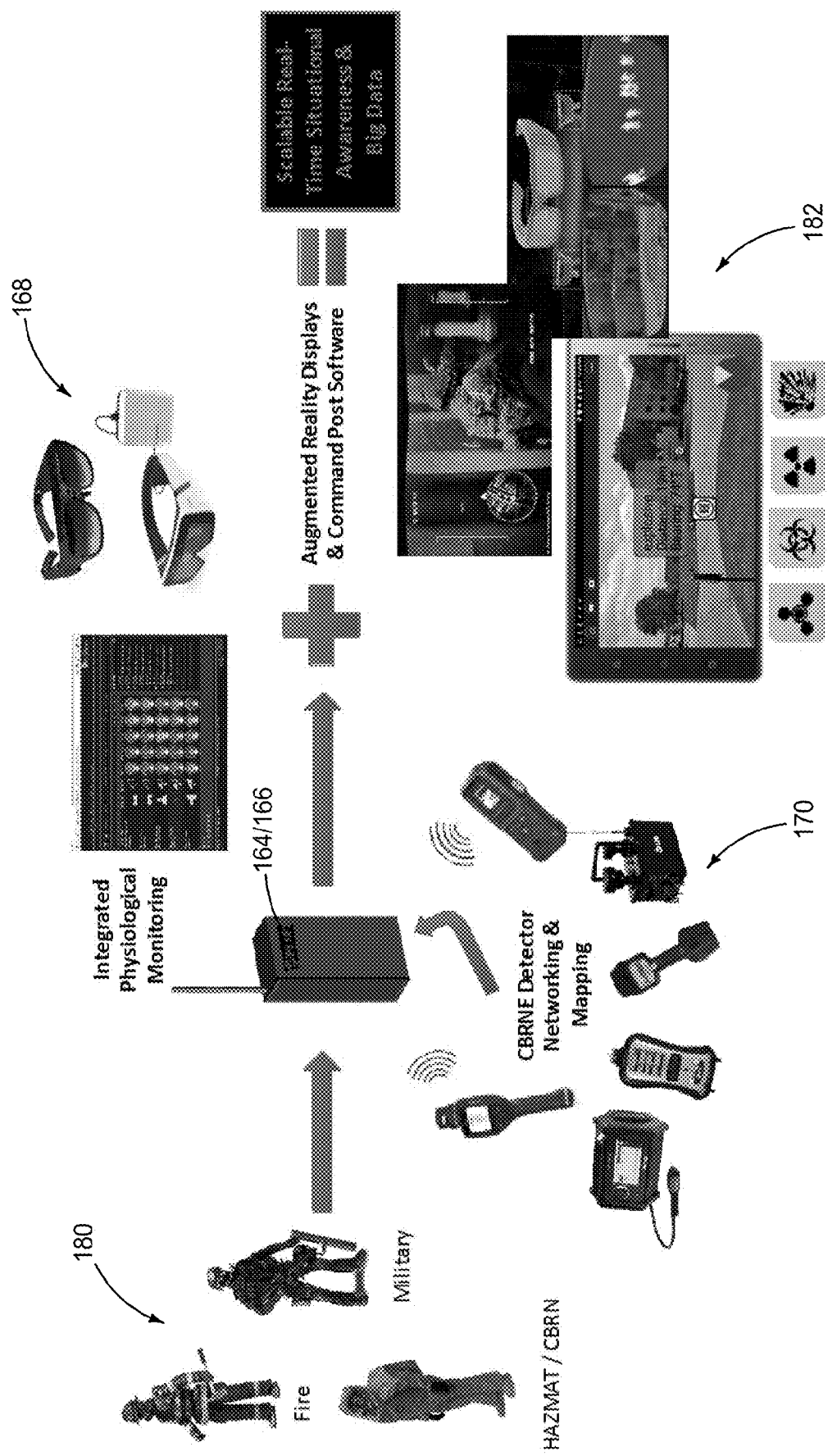

FIG. 19 is a system for identifying threat materials such as CBRNE threats according to an embodiment of the disclosure.

Figure 20:
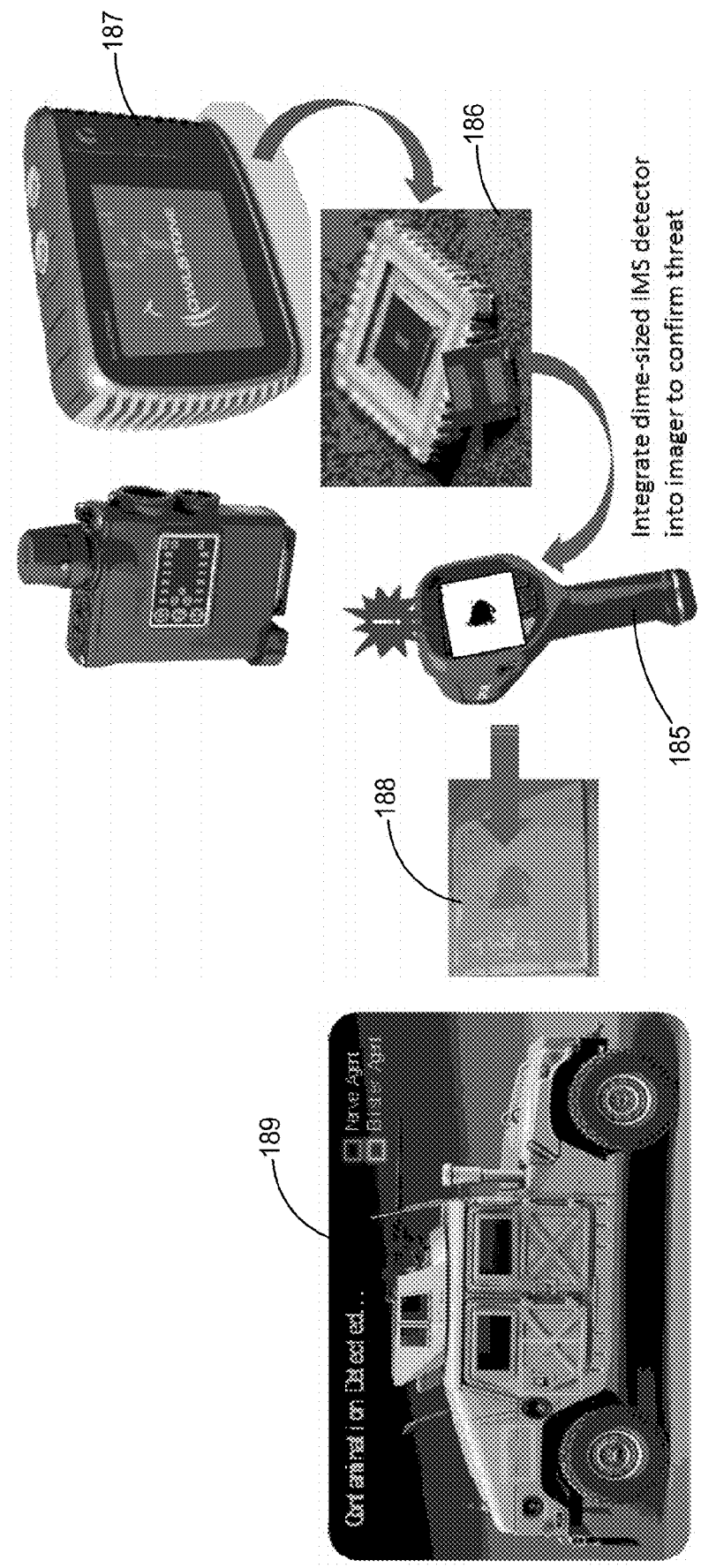

FIG. 20 is a method for identifying and dealing with threat materials such as CBRNE threats according to an embodiment of the disclosure.

Figure 21:
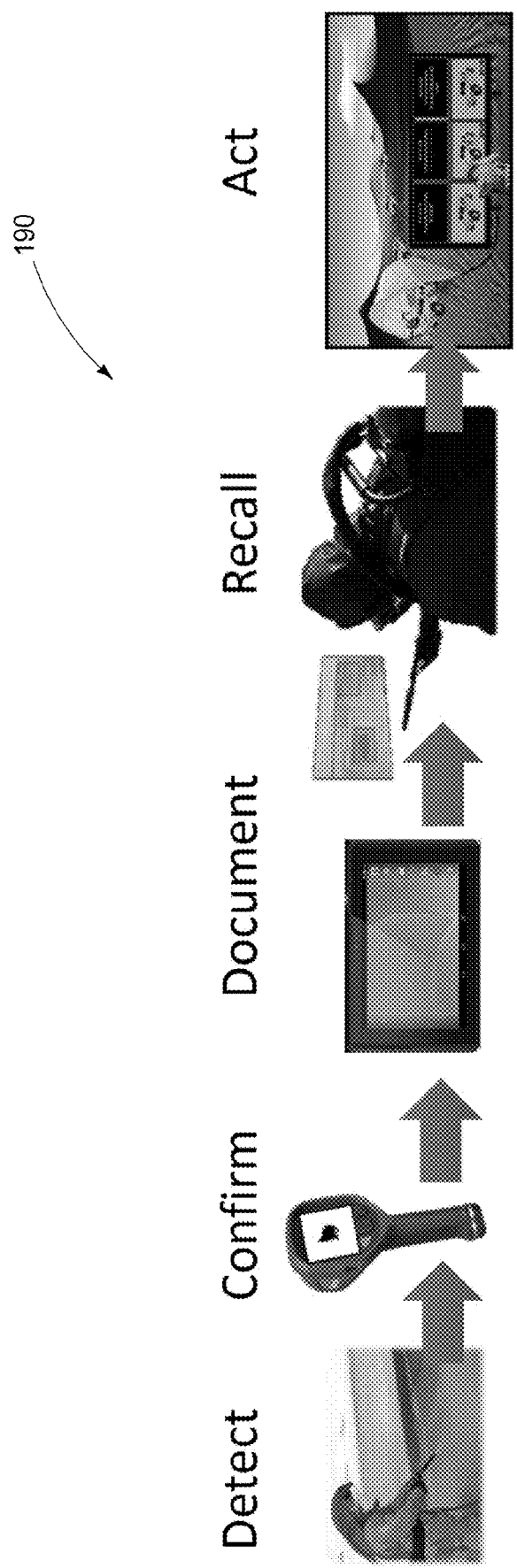

FIG. 21 is a method for confirming threat materials such as CBRNE threats according to an embodiment of the disclosure.

Figure 22:
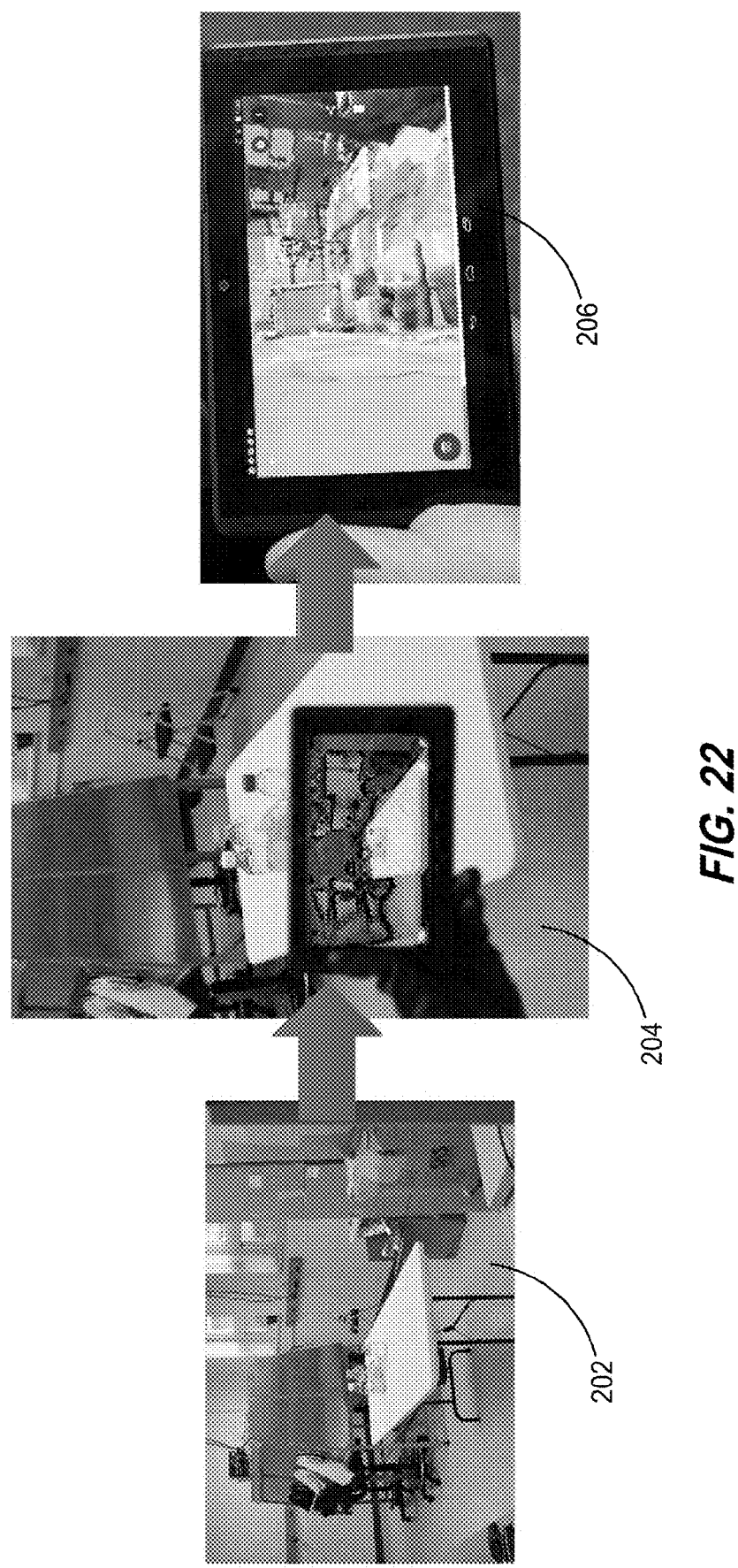

FIG. 22 is a continuation of the confirmation of CBRNE threat according to an embodiment of the disclosure.

Figure 23:
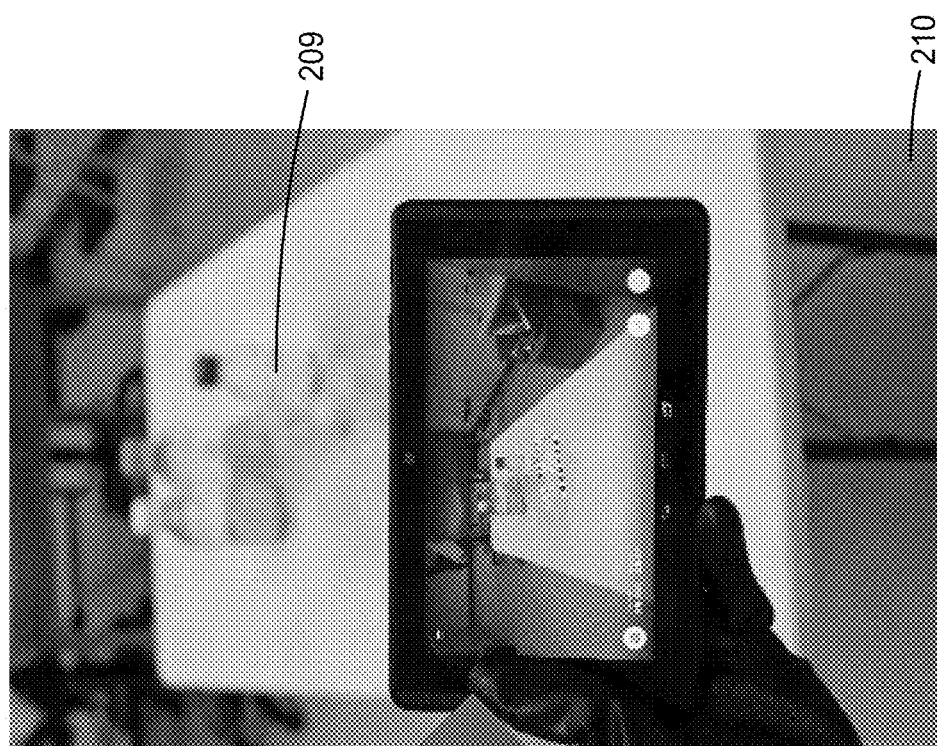
Figure 23:
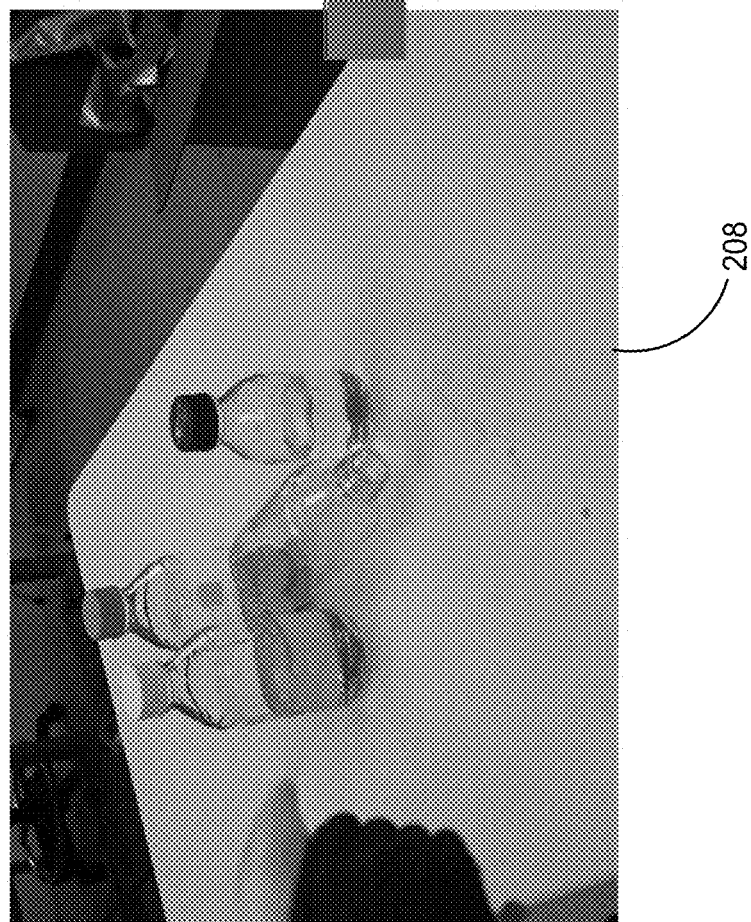

FIG. 23 is yet another continuation of the confirmation of CBRNE threat according to an embodiment of the disclosure.

Figure 24:
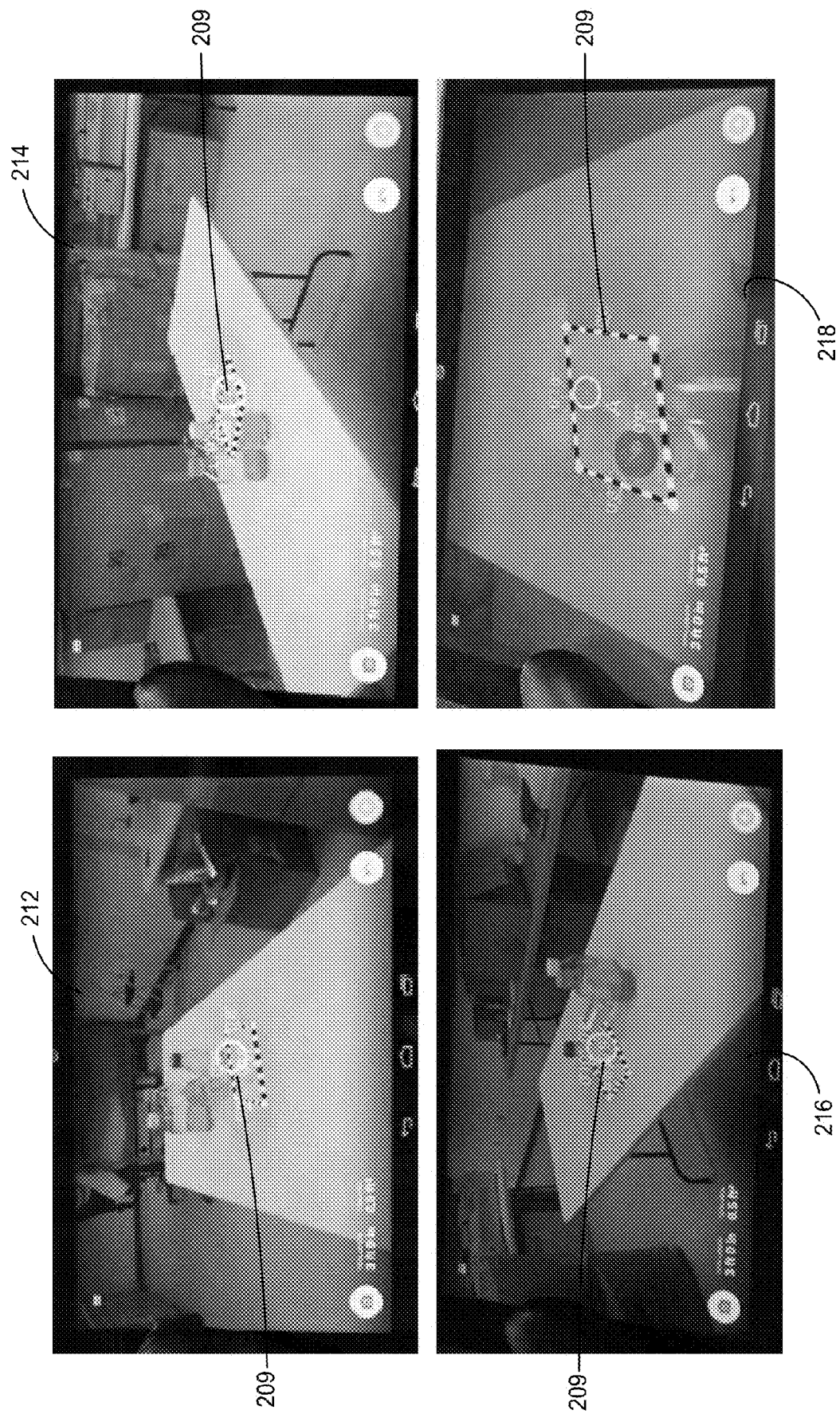

FIG. 24 is additional confirmation of the CBRNE threat according to an embodiment of the disclosure.

Figure 25:
Figure 25:
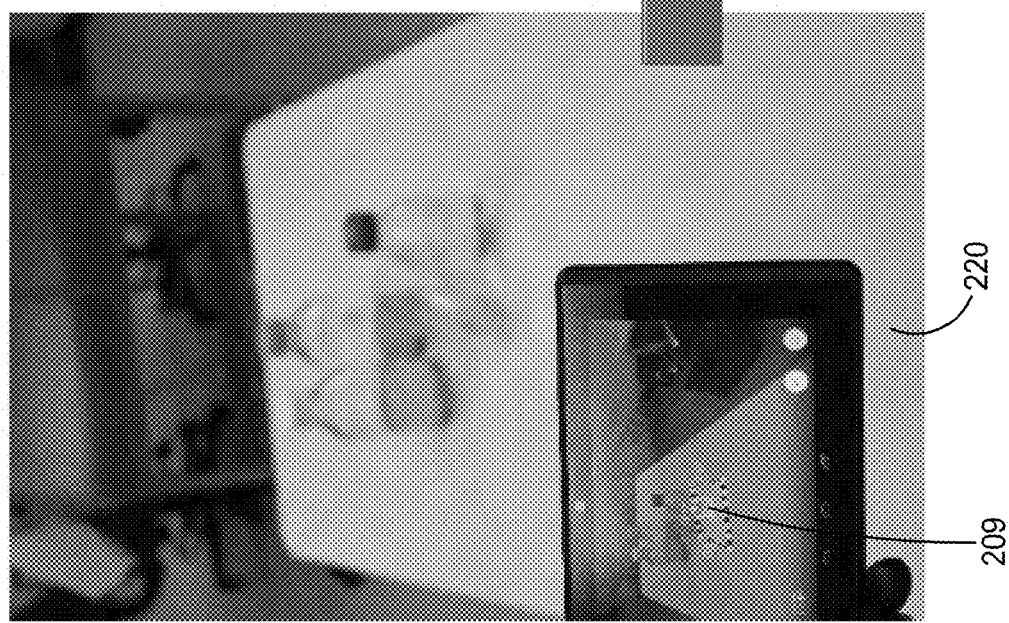

FIG. 25 is a depiction of augmented reality threat display according to an embodiment of the disclosure.

FIGS. 26A and 26B are images of capturing an image of a treated material and the captured image.

FIGS. 27A and 27B are images of capturing an augmented live image and the augmented live image.

Figure 28:
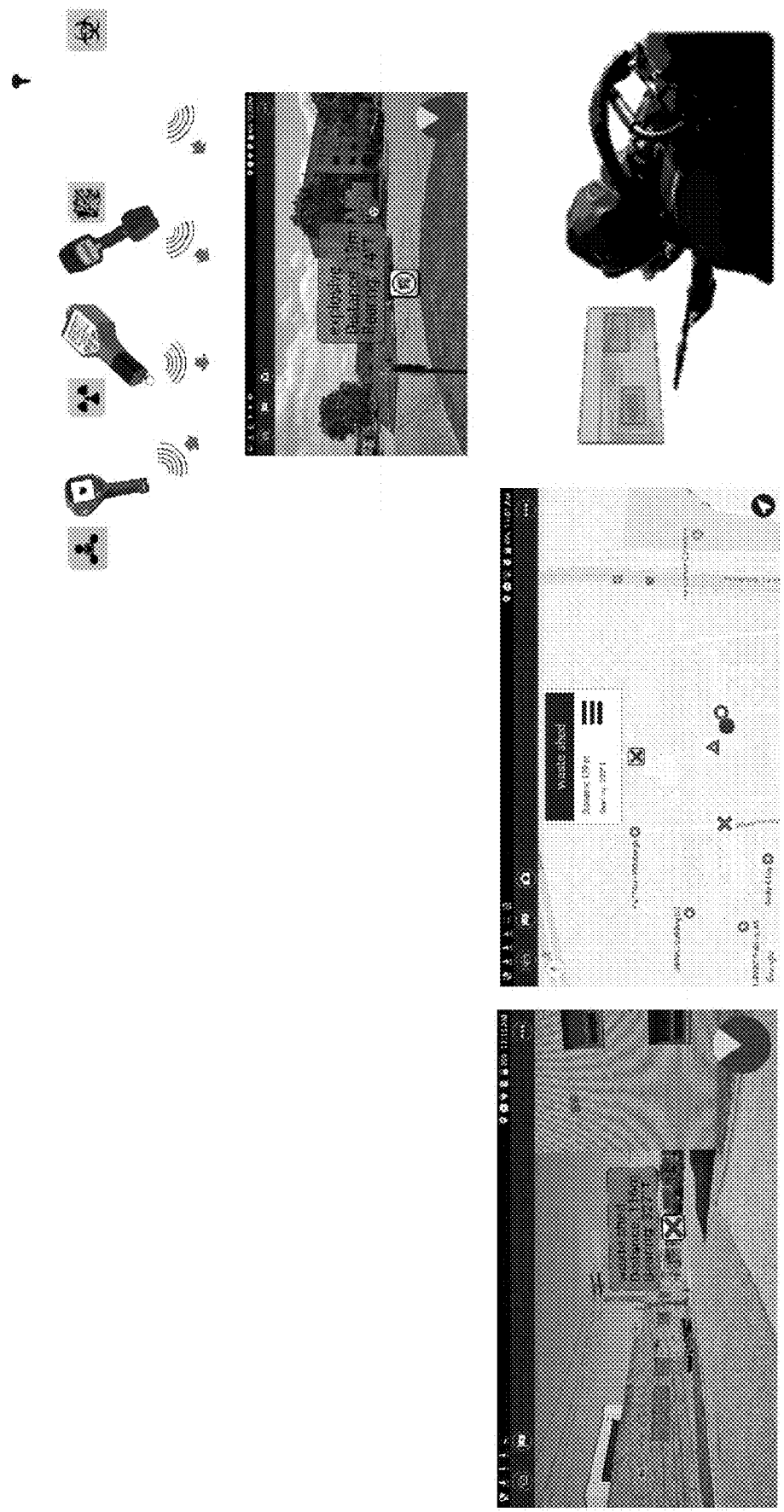

FIG. 28 is another depiction of augmented reality threat display according to an embodiment of the disclosure.

Figure 29:
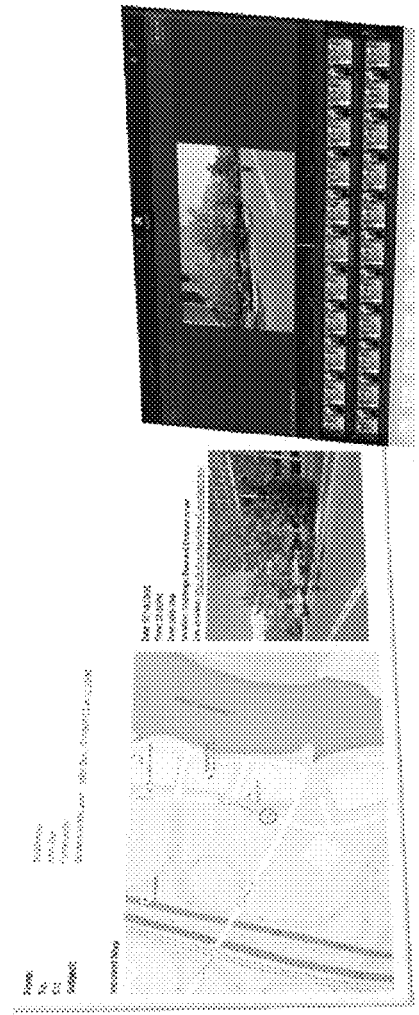
Figure 29:
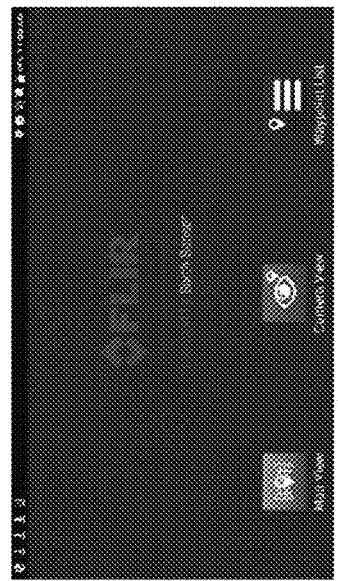
Figure 29:

FIG. 29 is a depiction of augmented mapping display according to an embodiment of the disclosure.

Figure 30:
Figure 30:

FIG. 30 is a depiction of CBRNE threat mitigation using data from augmented reality display according to an embodiment of the disclosure.

Figure 31:
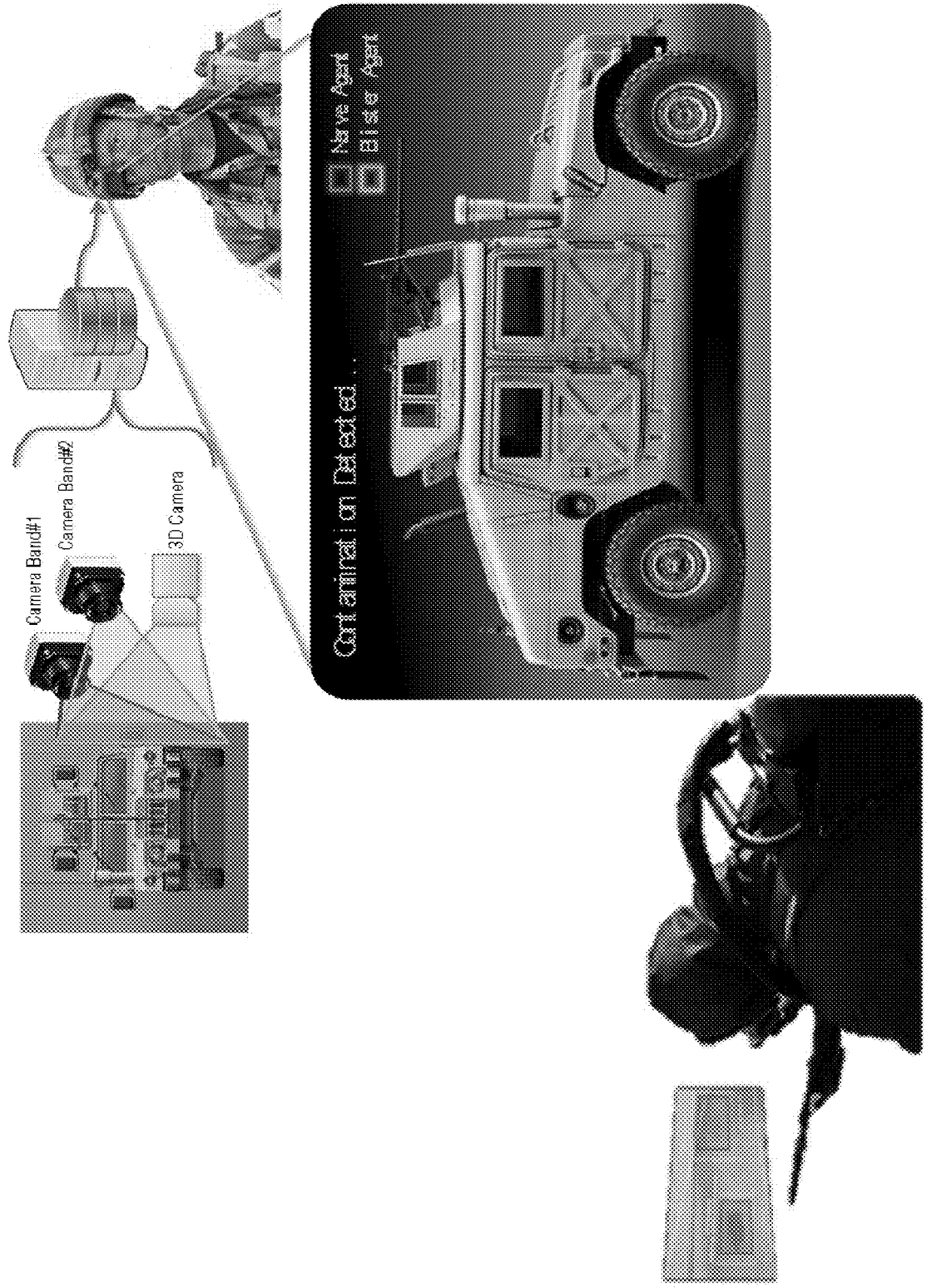

FIG. 31 is an example of automated mitigation or decontamination according to an embodiment of the disclosure.

Figure 32:
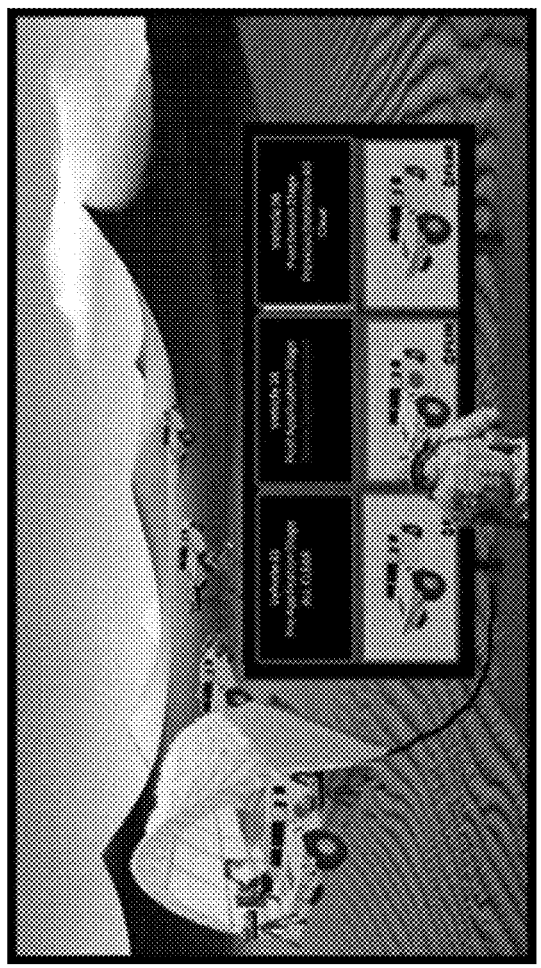
Figure 32:
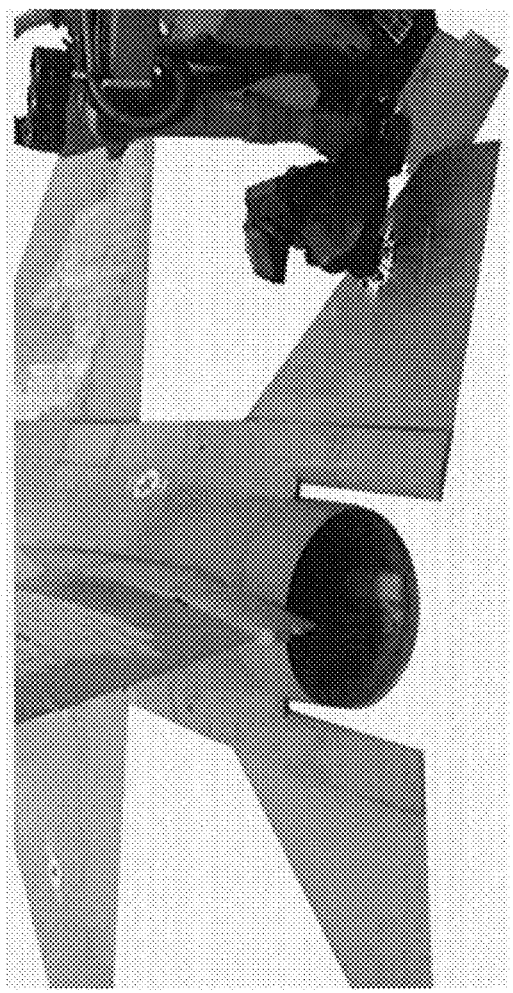
Figure 32:
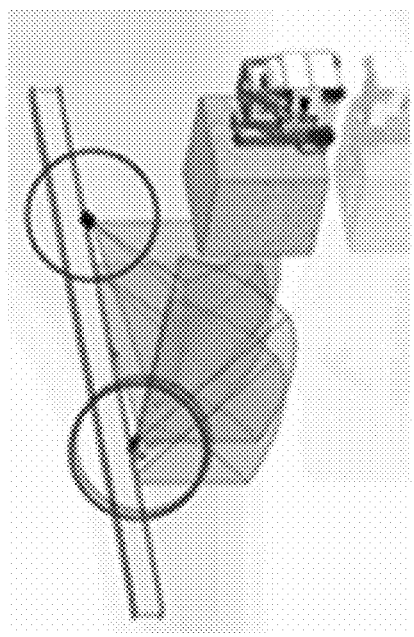

FIG. 32 is an example of automated mitigation or decontamination according to an embodiment of the disclosure.

Figure 33:
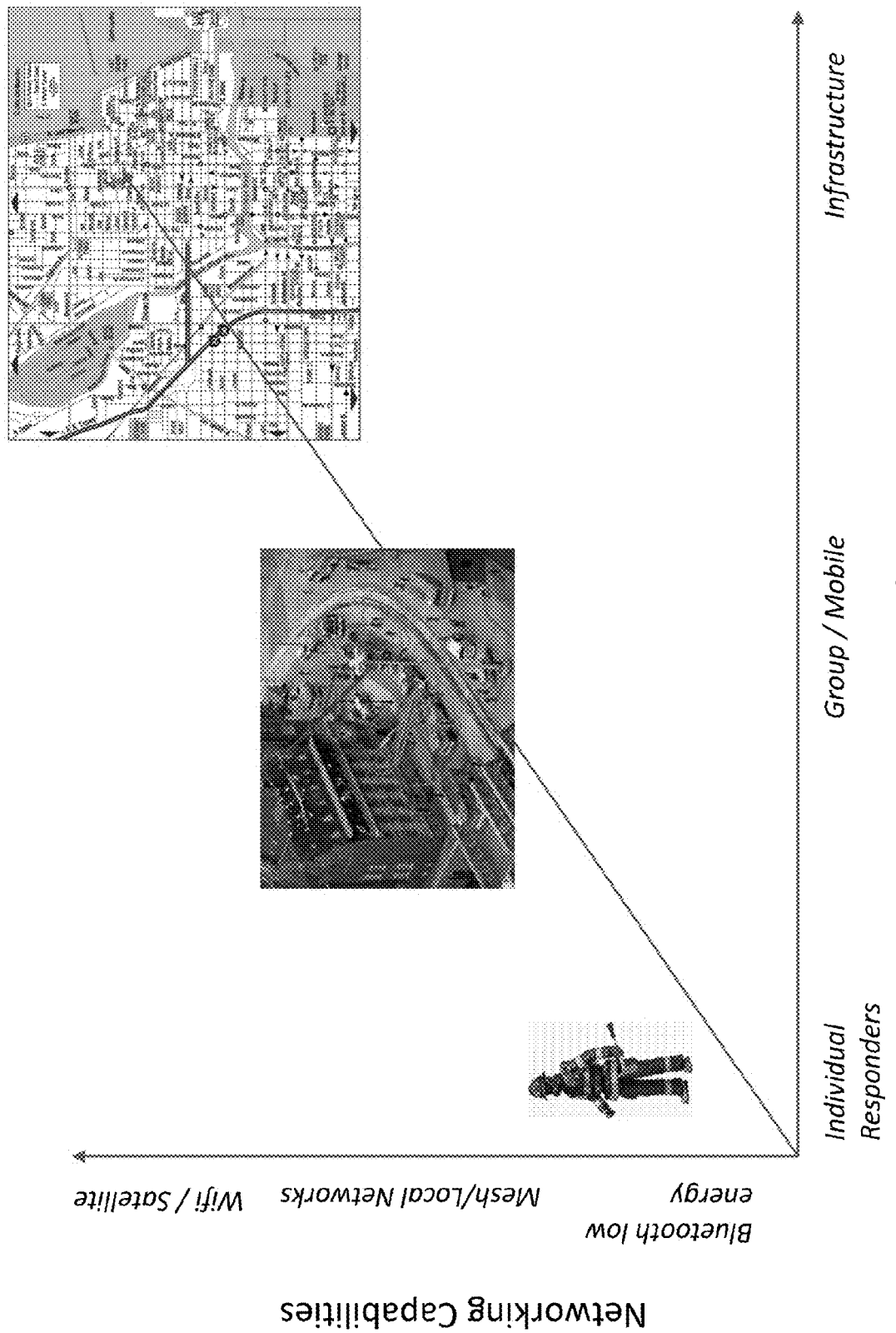

FIG. 33 is at least one network that can be provided demonstrating previous identification of CBRNE threats.

Figure 34:
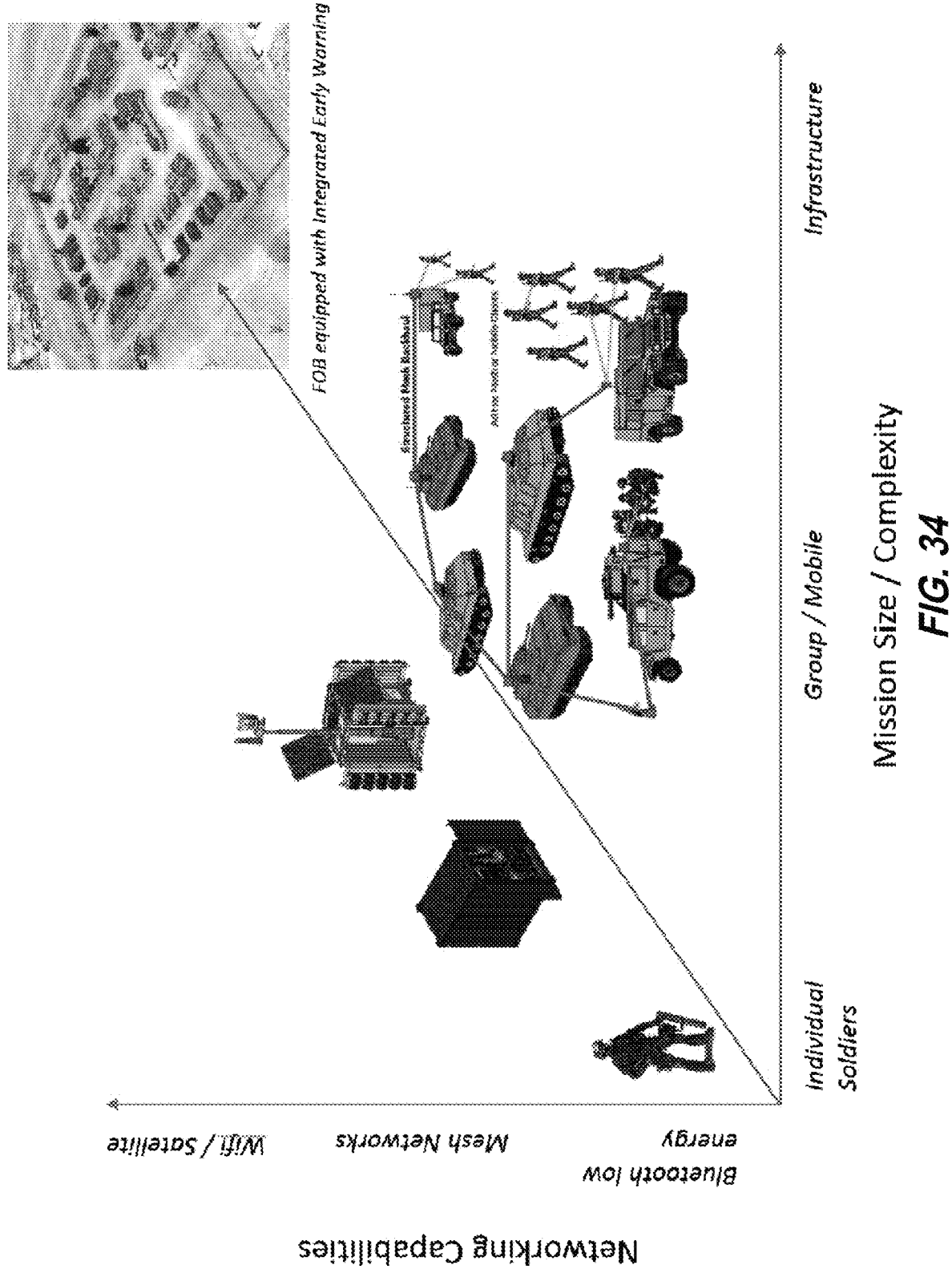

FIG. 34 is another network that can be provided displaying previously identified threat materials such as CBRNE threats.

DESCRIPTION

This disclosure is submitted in furtherance of the constitutional purposes of the U.S. Patent Laws "to promote the progress of science and useful arts" (Article 1, Section 8).

Multifunctional imaging devices are provided that can be configured to read the signal of threat material detectors such as CBRNE threat detectors. The imaging device can employ cameras with multispectral overlay to identify detection signals and/or enhance those signals to a user on a graphical display. The display may be part of a handheld or wearable device. An integrated chemical detector can provide orthogonal confirmation of threats to reduce the incidence of false determinations or provide semi-quantitative analysis of positive results from highly sensitive surface threat detectors. Orthogonal detection can be queued by identification of a positive surface sensor response.

CBRNE threat detectors can include chemical agent disclosure sprays, explosive trace detectors, biological analyzers and/or collectors, bio-threat detectors and/or collectors, gas chromatography/mass spectrometry instruments/detectors, mass spectrometry instruments/detectors, ion mobility spectrometers, radiation detectors, spectroscopic radiation detectors, and/or radionuclide identification devices.

Embodiments of the systems can overcome poor surface detector signal visibility for users with restricted fields of vision due to limited lighting conditions and protective equipment. Systems can allow users to rapidly scan areas where CBRNE threat detectors have been used and receive real-time, automated information regarding threats that may be present. Determination of colorimetric or fluorescent signals can be more objective by removing user interpretation of signal appearance in certain embodiments. The systems can provide threat information to users in an augmented way that makes the threat more actionable. By integrating orthogonal detection capability triggered by identification of surface sensor responses, the system can greatly reduce the problematic incidence of false determinations through alternate confirmation.

A contamination mapping system that overlays Agent Disclosure Spray (ADS) detection locations on a three-dimensional digital model that can be recalled after the ADS is removed is provided. This capability can give the warfighter greater situational awareness during decontamination and reconnaissance operations.

Using ADS, the warfighter can identify the CBRNE via a localized colorimetric change, wherein red indicates the presence of the target chemical warfare agent (CWA). There are presently formulations for G- & V-series nerve agents, sulfur mustard (HD) and opioid drug compounds, for example.

ADS is a sprayable enzymatic sensor which allows the warfighter to locate trace CWA contamination on surfaces via a localized colorimetric change. Another formulation that detects trace quantities of HD and one which detects pharmaceutically-based chemical agents is contemplated. These formulations may detect G- & V-series nerve agents and HD at trace levels.

ADS is already being fielded for Heavy Mobile Equipment decontamination. Since 2010, warfighters have developed several Concepts of Operations (CONOPs) for the use of ADS. ADS has been used at the beginning of a triage line for vehicles used in the field to determine the presence of CBRNE threats.

Vehicles are assessed and decontaminated according to the extent of contamination disclosed. ADS can then be used again at the end of the process to confirm that the CWA has been decontaminated properly. ADS provides capabilities to locate contamination and focus decontamination efforts only on local hotspots, which drastically reduces the time and logistical burden required to perform decontamination. Further, equipment, personnel, and fixed sites can be returned to operational capability more quickly. ADS in these roles can act as a force multiplier, allowing the warfighters to maximize their limited resources of their labor, time, and materials to accomplish their decontamination tasks more efficiently.

Despite existing capabilities, the warfighter requires ADS to provide better tactical functionality at reduced life cycle costs (LCCs). In order to fulfill this need, improvements to the chemistry, application process, and imaging capabilities are required.

The Agent Disclosure Spray is a highly sensitive surface sensor for detection of chemical warfare CBRNEs directly on surfaces. Once applied, the liquid formulation can provide either a yellow (negative) or red (positive) visible color response to specific chemical threats. The present system has the potential for future versions to detect other Chemical, Biological, Radiological, Nuclear, and Explosive (CBRNE) threats as well as drugs or Toxic Industrial Chemicals/Materials (TICs/TIMs). Detection signals are not limited to direct visible color but may also include infrared (IR), ultraviolet (UV), fluorescent, or luminescent responses.

Imaging devices of the present system can provide for a system capable of using multiple cameras with and without specific optical filters to simultaneously view an area where the surface threat detector has been applied and specifically identify local positive detection responses. The use of specific cameras and filters can provide for the integration of multiple threat detectors (CBRNE, drugs, TICs/TIMs, thermal, etc.) by reading a variety of spectral signals (visible, ultraviolet, infrared, fluorescent, luminescent) in environments where visibility may be limited. The software algorithm may analyze the filtered images to determine specifically where positive threat detection signals are present pixel by pixel in the field of view, for example. The signal of interest may then be overlaid on the visible scene image and visibly highlighted to the user with false color mapping on a display in real-time. Accordingly, the device can provide actionable information to the user. The device may be configured with built-in memory to automatically capture, store, and recall images. Wireless features can be included to allow for networking capability to relay information, and GPS can provide geolocation capability. Form factors for the imaging device can include either a handheld imager or a wearable system.

Orthogonal detection capability may also be integrated into the imaging device. This capability may use Ion Mobility Spectrometry (IMS), Raman Spectroscopy, or other common chemical detection methods. By incorporating this capability, the system can significantly reduce the incidence of false positive determinations by enabling specific chemical threat identification. Some limited quantification capability is introduced based on the sensitivities of surface detectors versus other chemical detectors. For instance, a positive response from both the surface sensor and the orthogonal detector may indicate a relatively high concentration of threat. A positive response from the highly sensitive surface sensor but negative response from the orthogonal detector indicates a trace concentration of threat. A negative response from both detectors can provide a high level of confidence that the target threat is not present. This innovation provides further novelty in that the orthogonal detector can be automatically triggered by identification of a positive surface sensor signal.

In accordance with example implementations, the systems can include a Handheld Imaging Platform (FLIR K-series camera (Rugged and reliable (IP67) for use in firefighting, relatively inexpensive, easy to use with gloves, (3" LCD display, multiple imaging modes, ability to save images); uses MSX technology for imaging (2-camera integration of multispectral imaging, real-time overlay of thermal and visible images, provide enhanced image resolution); translatable to visible+filtered image overlay; Tablet-Based Imaging Platform (3D mapping of environment, real-time detection). The systems of the present disclosure can provide a process for detection interpretation with an imager (1) apply threat Indicator (2) collect image (3) make determination of contamination (automated and confirmed) (4) act upon determination.

The systems and methods can accommodate filtered camera views for detection signals, faster locating of detections, adaption for future operations (AR/Auto-Decon). Pixel by pixel determinations of color, clean/contaminated decisions, highlights contaminated spots to user, putting a box around adjacent contaminated pixels, can lock location until user clears alert.

False-Color augmentation can be displayed using MSX technology to enhanced resolution of secondary image on visible background real-time display, processing circuitry can identify threat detection signal based on filtered image, the systems and methods can apply false color to filtered images, enhance detection response on visible background display, identification tags may be provided.

The system can have hands-free imager capability, monocular device & heads-up display on mask, integrated capability for protection, disclosure visualization, and documentation.

The system can include spectral reader confirmation; after a spot is indicated as contaminated the spectral reader will confirm it is a detection and minimize user/equipment error (IMS integrated confirmation, integrated ion mobility spectroscopy detector to confirm threat.

The disclosure spray use can be combined with digital mapping technology to allow the warfighter to capture and recall 3D models with superimposed ADS detection signals. This system can be a portable system and may use both color and depth sensing cameras for detection signal recognition and model generation. Simultaneous Localization And Mapping (SLAM; provided as part of a ROS (Robot Operating System), a free and open source framework for robot software with a RTABMAP (Real-Time Appearance-Based Mapping) capability: https://www.ros.org/) software can be used to track the location of the sensor relative to the target as a scan is performed.

The system can include a single camera or system of cameras equipped with area-learning capabilities configured to map a 3-dimensional object. The system can be optimized for scanning speed and resolution.

As part of this system, methods can be implemented which associate a color with a specific location; for example, a red color to a specific location on the object, and may also include an object's track, such as a GPS map of the object's track.

The methods can be configured for detecting nerve agent simulants paraoxon and diethyl VX on tan and green Chemical Agent Resistance Coating (CARC), non-skid coating, and aircraft aluminum, as well as other surfaces such as SBR rubber, sand, and dark carpet, for example.

The systems can be configured to make measurements of complex 3D objects and render models. The systems can include an outdoor sensor head and power supply, as well as outdoor camera calibration procedures, for example. The systems may be configured to operate in varying light conditions and/or on varying surface types. Image processing, model generation time, and mapping may be conducted of an armored fighting vehicle in 10 minutes.

The systems can provide a detailed map of contamination under operationally relevant environmental conditions with a resolution of recorded contamination locations of within 3 inches or within 1 inch, when reading a contamination from up to a 15-foot standoff distance.

Figure 7:
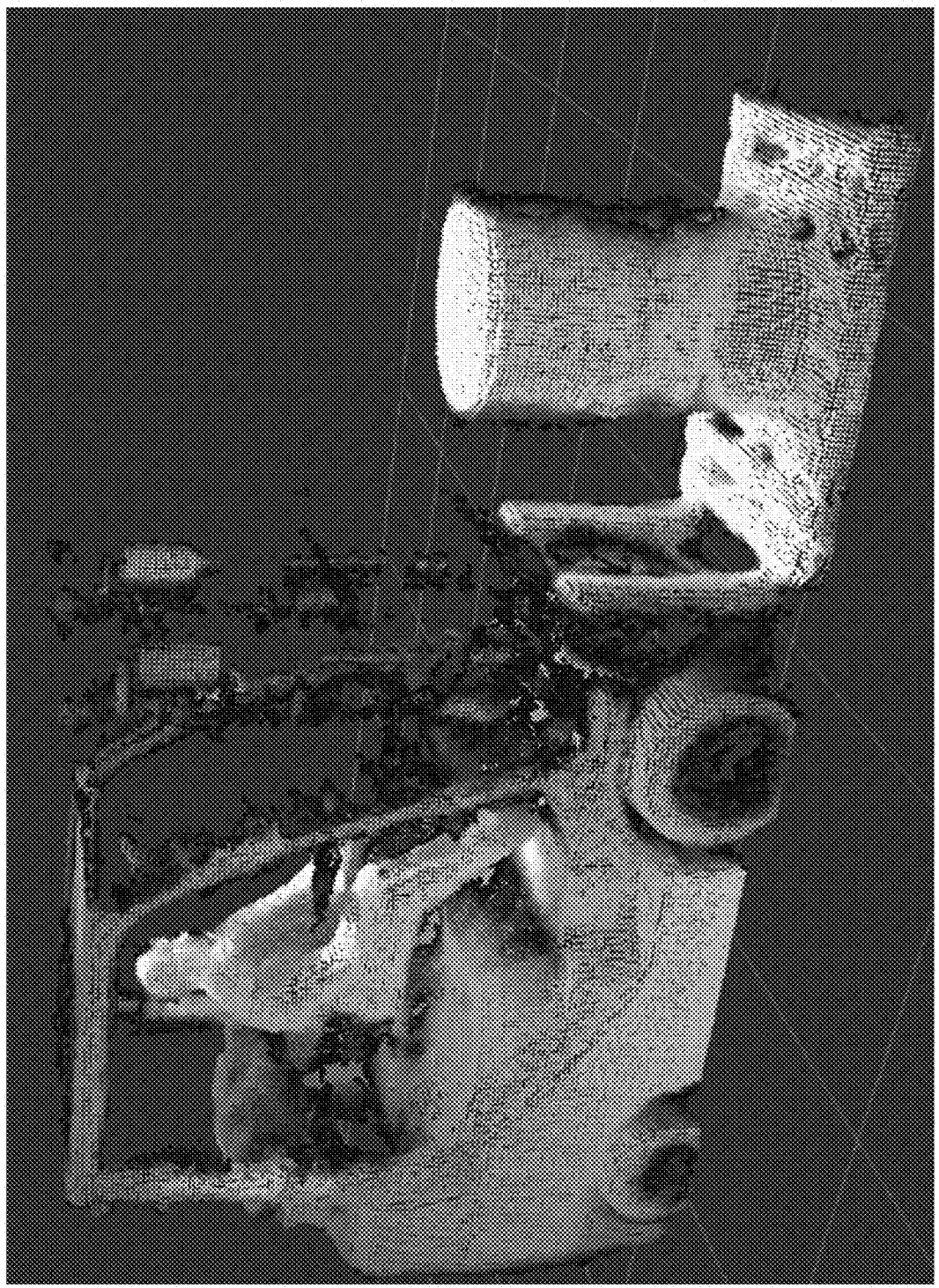
FIG. 7 is a display of a processed image according to an embodiment of the disclosure.

In accordance with at least one implementation, a 3D robotic imaging and modeling platform can be adapted to generate a 3D model of a complex object. These platforms can be used to generate a 3D mesh model from several cameras in a fixed location to create a model; for example, a forklift carrying a steel drum as shown in FIG. 7.

The modeling system can be configured to determine the requisite number of color and depth sensing cameras required to generate models for a vehicle, and can demonstrate optimized scanning speed and resolution on a small scale. The mapping software can be customized to use sign posts for camera position tracking. The cameras can use these sign posts to recalibrate their position if they are being moved too quickly or unsteadily during the scanning process. The system can be configured to operate without these sign posts as well.

A color detection process can be integrated into modeling software to begin generating contamination maps of objects. The system can be utilized to detect nerve agent pesticide simulants on operationally-relevant surfaces such as CARC and non-skid coating. The system can also be configured to provide a tag or tags that can be overlaid with the 3D model of a bench-scale object to provide a mapped contamination.

In accordance with other implementations, a user may visualize a contaminated area from safer distances and with higher confidence than is possible with the naked eye or other imaging techniques. By locating and saving information in a 3D digital map, data can be recalled after the ADS is removed or signals fade, focused decon and decon assurance operations on precise areas of concern can be obtained. Further, clearance decon may check vapor off-gassing before transporting equipment or vehicles on C130 airplanes. Additionally, data can be transmitted wirelessly to other devices or a command center to provide optimal situational awareness among warfighters. An eventual application of this technology could involve integration with an automated robotic decontamination system, further protecting the warfighter from contamination exposure risks.

As described herein, a digital contamination mapping software application can be developed for use with a mobile phone or tablet. The device can be equipped with depth-sensing capabilities that can be used to generate a 3D mesh network map or high resolution model of an area. Software can link information to specific locations in these 3D maps, which can be recalled at a later time or from a remote location, see for example FIGS. 5 and 6 demonstrating a tag (arrowed) superimposed onto an ADS detection signal and remain in place when viewed from any angle or distance.

The systems process images so that red ADS detection signals are augmented to be more visible to the user of the device as part of the system. FIGS. 12-14 depict the initially developed and processed images.

The systems and methods of the present disclosure can be compatible with live video in order to allow real-time detection signal augmentation. This algorithm will be integrated into the app to allow for ADS detections to automatically be tagged and stored in a 3D map by the imaging device. Further capabilities beneficial to the user can be designed into the software, such as mapping of potential ADS interferents and measuring distances from the user to contaminated areas. Additionally, GPS positioning capability can be included into the system for reconnaissance mapping of contamination.

Figure 8:
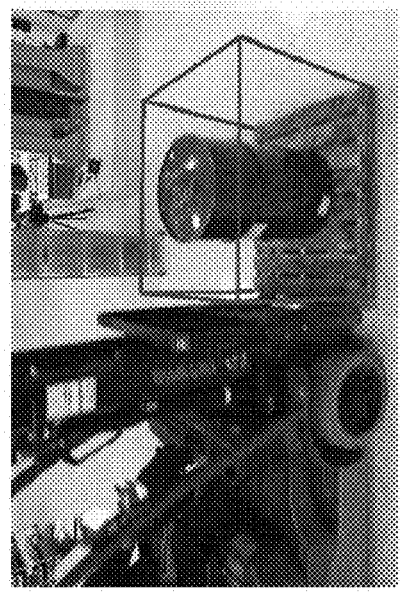
FIG. 8 is a display of an image processing series according to an embodiment of the disclosure.
Figure 8:
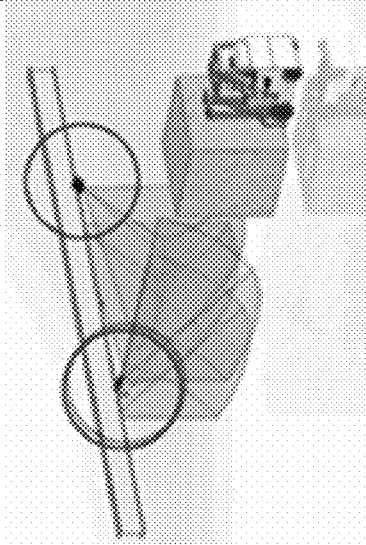
Figure 8:
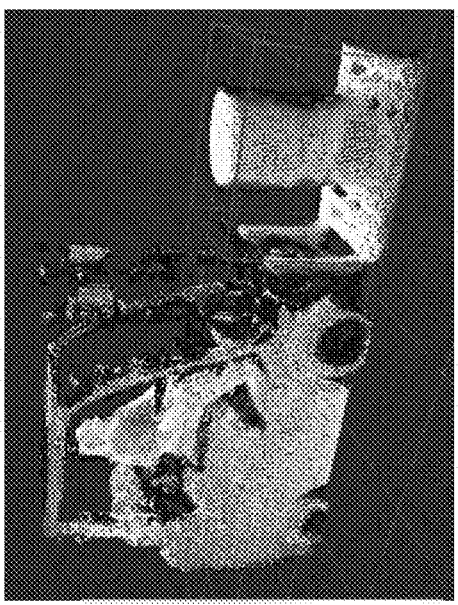

As indicated above, the imaging platform can create a 3D model of objects such as vehicles in real-time as the objects move past cameras. For example, images of objects may be captured by one or more cameras. The systems and processes of the present disclosure operate to tag a portion of the image and/or prepare an alternative image, such as an alternatively colored image highlighting specifically pre-defined colors. The systems and processes may also create 3-dimensional images. The alternative images can be screened for CBRNE threats and where determined those threat locations tagged on the image. Referring to FIG. 8, in accordance with an implementation of the systems and methods of the present disclosure, an object such as a fork lift carrying a load is viewed by multiple cameras. The system and methods capture the load being carried on the forks, wherein, (A) RGB image of the fork lift driving past the 3D cameras with the load on the forks boxed in by the software (B) a system diagram (C) the software created 3D model of the forklift and cargo.

The systems and methods of the disclosure can recognize and dynamically capture an object as it is moved through a cluttered environment, which would be very useful in tracking moving vehicles through a field decontamination line.

The system can also provide for threat mapping and/or augmented recall. For example, systems can provide a new way of integrating, recalling and displaying information through the generation of 3D augmented conceptualizations pinpointing the location of tagged objects in a profiled environment. The systems can compile data from a multitude of threat or environmental detectors (i.e. CWA, TICS, explosives, radiological, thermal, biological, etc.), and spatially tag the information using 3D high-resolution mapping software (i.e. GPS, Mesh, LIDAR scanning, computer vision hardware, etc.). Sensor detection, location and time inputs can be integrated in real-time to generate a recallable augmented representation to generate a 3D projection displaying the location and identity of tagged features with high accuracy (mm-yards).

The sensor input data can also be recalled as a 3D model, versus a 3D projection. In this case, the 3D model displaying detector data would not be overlaid in the real environment, but would be viewed as a high resolution image on a tablet, smart phone, or any other viewing device. The systems can provide communication of actionable, real-time information from multiple CBRNE sensors to a central data processing system to generate threat maps that can then be used by a central command post or disseminated to end users in the field for detector/sensor-free viewing. This information display method can create a history and high-res map of threat events that can be recalled and transmitted on demand.

The system can improve overall situational awareness of the warfighter by allowing for the communication of CBRNE and other environmental threats to be viewed in real-time in the field without having the sensor that detected the threat first hand present. Further, the system may use a multitude of position determination techniques such as LIDAR, 3D Mesh, and computer vision hardware in addition to geo location (GPS) to more accurately determine the location of a threat compared to that of using GPS alone. If a threat is found on an object, the location of the threat can also be determined in relation to the object itself versus the geo location of the threat. This, combined with the barcoding capability of the innovation, can allow the user to recall the location of contamination even if the object that contained the contamination has moved. In addition, the innovation could enable the use of robotic decon by transferring locations of contaminated areas to unmanned systems, as well as enable assessment of long term materials compatibility after threat exposure.

The threat mapping and augmented recall capability system and methods of the present disclosure can provide for a tag and scan capability that allows an object/area to be pre-mapped and stored in a library, or a method for scanning objects and spaces in real-time. Sensitivity and scan speed (for both the 3D model/map generation and the contamination map) can be tunable to the threat scenario. Rapid scans can be used to identify gross amounts of threat contamination and slow scans can be used for trace detection. Combined superposition of chemical threat data and thermal map may be utilized to identify potential threats in a suspect chemical lab or potential WMD environment. Innovation will be applicable in both outdoor and indoor environments by employing GPS and laser mapping methods. Wireless features will enable networking capability to relay information, and GPS can provide geolocation capability. Form factors for the contamination map generation/viewing device could include commercial off the shelf 3D scanners that serve as a tablet accessory or custom cameras with custom software algorithms. Augmented reality devices can include but are not limited to wearable devices such as glasses, heads-up displays, monocular device, hand-held devices such as a tablet or smart phone, or spatial augmented reality, which requires a projector but no wearable or hand-held devices.

Figure 1:
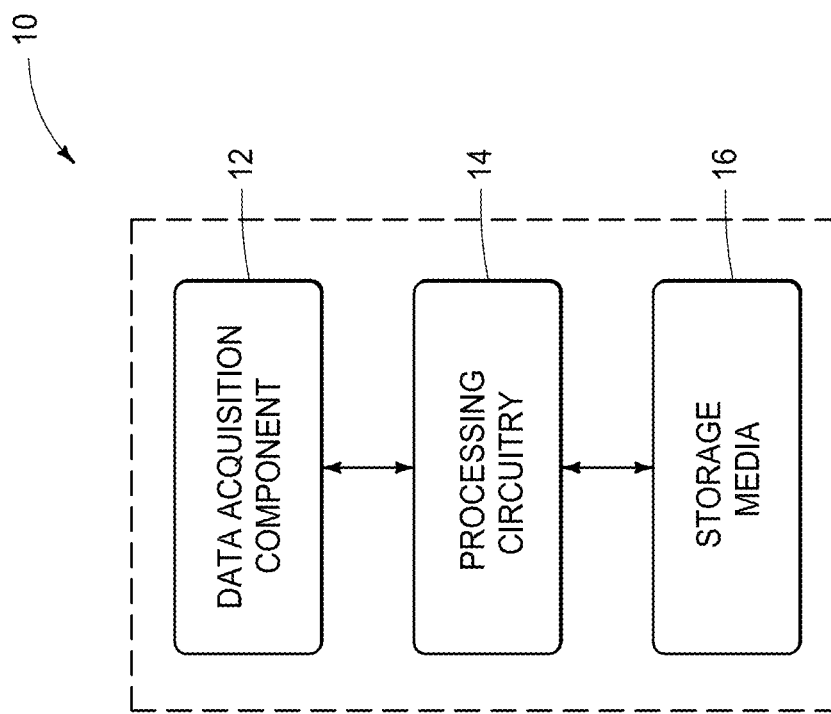
FIG. 1 is a system for identifying threat materials such as CBRNE threats according to an embodiment of the disclosure.

The systems and methods of the present disclosure are further described with reference to FIGS. 1-34. Referring first to FIG. 1, a system 10 is shown that includes a data acquisition component 12 operatively coupled to processing circuitry which is operatively coupled to storage media. While shown in line, the components of system 10 may be aligned in alternative fashions contemplated by the disclosure and recognized as operable in the industry.

Data acquisition component 12 is a component for acquiring physical data. Physical temperature pressure, humidity, light, darkness, pictures, chemical, biological, are all data that can be acquired by data acquisition component 12. In accordance with example implementations, the data acquisition component can be an image acquisition device such as a digital video camera and/or still picture camera, for example. In accordance with other example implementations, data acquisition component 12 can be analytical devices such as CBRNE analytical instrumentation, for example.

Data acquisition component 12 can be operably coupled to processing circuitry 14, and processing circuitry 14 can be a personal computing system that includes a computer processing unit that can include one or more microprocessors, one or more support circuits, circuits that include power supplies, clocks, input/output interfaces, circuitry, and the like. The computing system can include a memory that can include random access memory, read only memory, removable disc memory, flash memory, and various combinations of these types of memory and this memory can be storage media 16 for example. The memory can be referred to as a main memory and be part of a cache memory or buffer memory. The memory can store various software packages and components such as an operating system.

The computing system may also include a web server that can be of any type of computing device adapted to distribute data and process data requests. The web server can be configured to execute system application software such as the reminder schedule software, databases, electronic mail, and the like. The memory of the web server can include system application interfaces for interacting with users and one or more third party applications. Computer systems of the present disclosure can be standalone or work in combination with other servers and other computer systems and/or software support providers. The system is not limited to a specific operating system but may be adapted to run on multiple operating systems such as, for example, Linux and/or Microsoft Windows. The computing system can be coupled to a server and this server can be located on the same site as computer system or at a remote location, for example.

In accordance with example implementations, these processes may be utilized in connection with the processing circuitry described to provide the dynamic localized media options. The processes may use software and/or hardware of the following combinations or types. For example, with respect to server-side languages, the circuitry may use Java, Python, PHP, .NET, Ruby, Javascript, or Dart, for example. Some other types of servers that the systems may use include Apache/PHP, .NET, Ruby, NodeJS, Java, and/or Python. Databases that may be utilized are Oracle, MySQL, SQL, NoSQL, or SQLLite (for Mobile). Client-side languages that may be used, this would be the user side languages, for example, are ASM, C, C++, C#, Java, Objective-C, Swift, Actionscript/Adobe AIR, or Javascript/HTML5. Communications between the server and client may be utilized using TCP/UDP Socket based connections, for example, as Third Party data network services that may be used include GSM, LTE, HSPA, UMTS, CDMA, WiMax, WiFi, Cable, and DSL. The hardware platforms that may be utilized within processing circuitry 70 include embedded systems such as (Raspberry PI/Arduino), (Android, iOS, Windows Mobile)—phones and/or tablets, or any embedded system using these operating systems, i.e., cars, watches, glasses, headphones, augmented reality wear etc., or desktops/laptops/hybrids (Mac, Windows, Linux). The architectures that may be utilized for software and hardware interfaces include x86 (including x86-64), or ARM.

Storage media 16 can be operably coupled to processing circuitry 14 and/or data acquisition component 12. Accordingly, these three entities of system 10 can be included in one housing or spread across different housings connected via hardwire and/or wirelessly to form a network for example.

Figure 2:
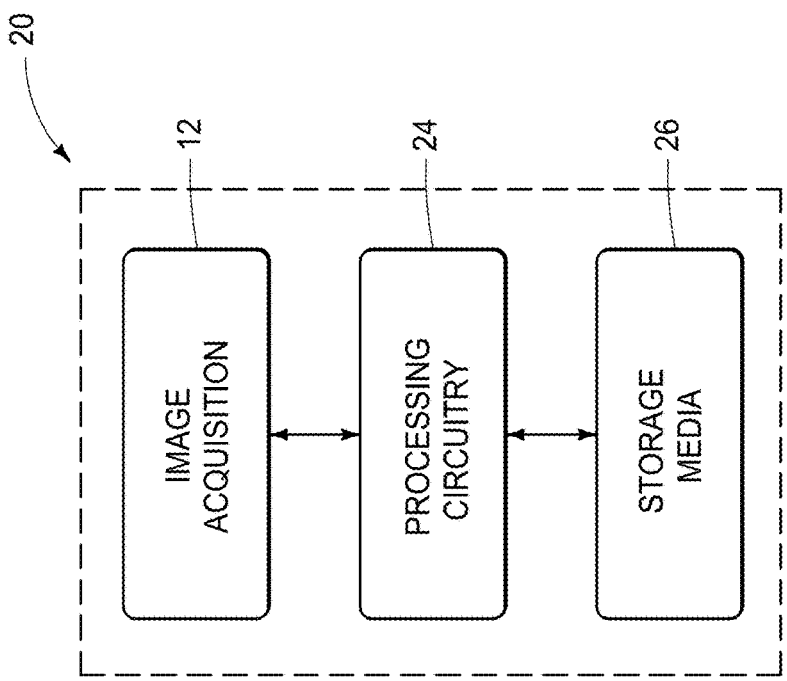
FIG. 2 is another system for identifying threat materials such as CBRNE threats according to an embodiment of the disclosure.

Referring next to FIG. 2, system 20 is shown that includes an image acquisition device 12 operably coupled to processing circuitry 24 and storage media 26. In accordance with example implementations, image acquisition device 12 can be a handheld device that provides digital imagery including digital video digital imagery. In accordance with example implementations, digital video imagery includes the capture of multiple still images and the alignment of same in files with each still captured being acquired in time fragments. These images can be compiled in the storage media 26 for recall and play and/or manipulation by processing circuitry 24. Such manipulation can include marking with a location, altering to augment the image, and/or altering to display depicted items as three-dimensional images.

Figure 3:
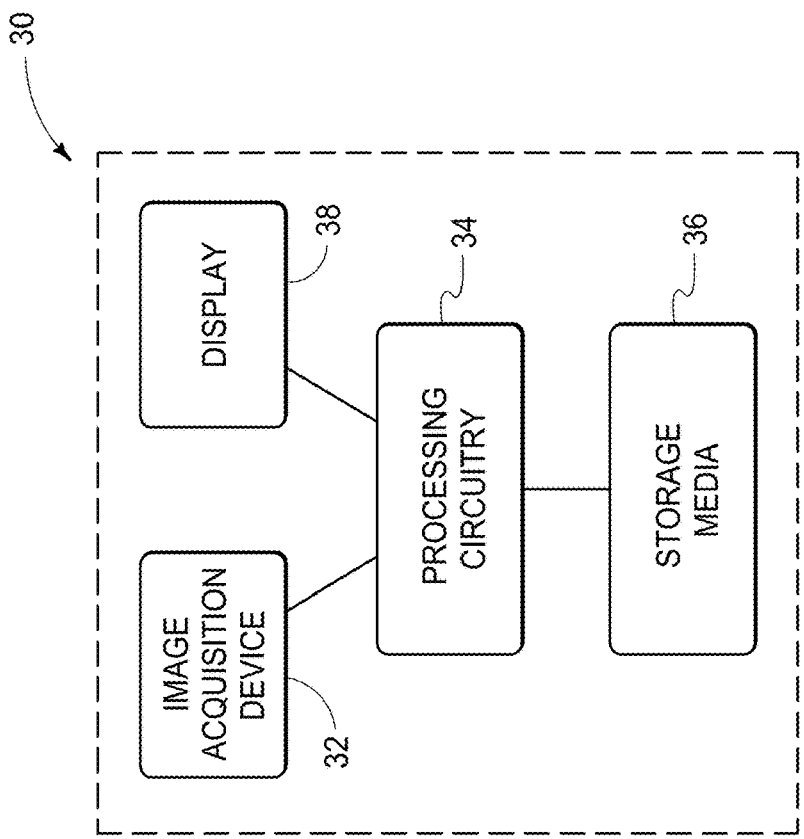
FIG. 3 is a system for identifying threat materials such as CBRNE threats and displaying same according to an embodiment of the disclosure.

Referring next to FIG. 3, system 30 is provided that includes an image acquisition device 32 operatively coupled to processing circuitry 34 and storage media 36, as well as display component 38. Display component 38 can be a graphical user interface, for example, and/or it can be a simple video display, as another example. Video display 38 can be configured to receive real-time imagery received by the image acquisition device and/or augmented imagery that has been processed and provided by processing circuitry 34 and storage media 36.

Figure 4:
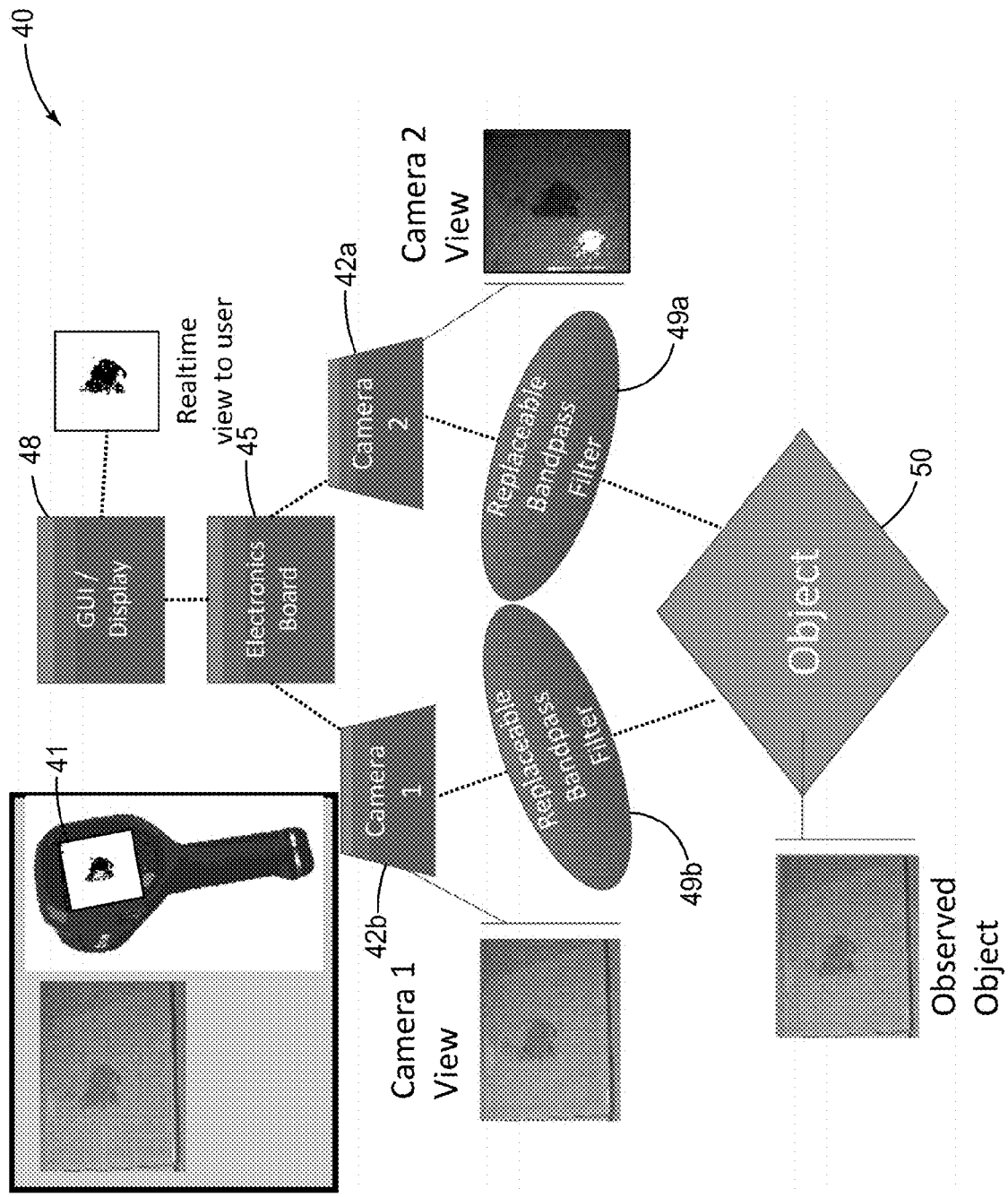
FIG. 4 is another system for identifying threat materials such as CBRNE threats and displaying same according to an embodiment of the disclosure.

Referring next to FIG. 4, an example system 40 is shown that can be configured with components as shown. System 40 can include image acquisition devices 42a and 42b operably coupled to an electronics board 45. Electronics board 45 can include a combination of processing circuitry and storage media as described herein. Electronics board 45 can be operatively coupled to a display 48 as described, and upon receiving video imagery of an object 50, replaceable bandpass filters 49a and 49b can be placed between either one or both of cameras 42a and 42b to provide an image to the electronics board that allows for the real-time display to the user of an altered image that highlights the detection of a CBRNE threat. CBRNE threats as used herein can be chemical or biological threats and in accordance with example implementations, the CBRNE threat can be a nerve CBRNE that has been identified through ADS as described herein. In accordance with example implementations, cameras 42a and 42b can be considered an analytical instrument in this regard, for they are analyzing physical data and determining the presence of a CBRNE threat.

As shown in system 40 multiple cameras can be utilized to acquire data relating to a field or object. This data may all be processed to more accurately define the location and type of CBRNE threat.

In accordance with example implementations, images acquired utilizing the systems described herein can have portions thereof tagged and/or portions thereof three dimensionally mapped.

Figure 5:
FIG. 5 depicts displays of tagged images according to an embodiment of the disclosure.
Figure 5:
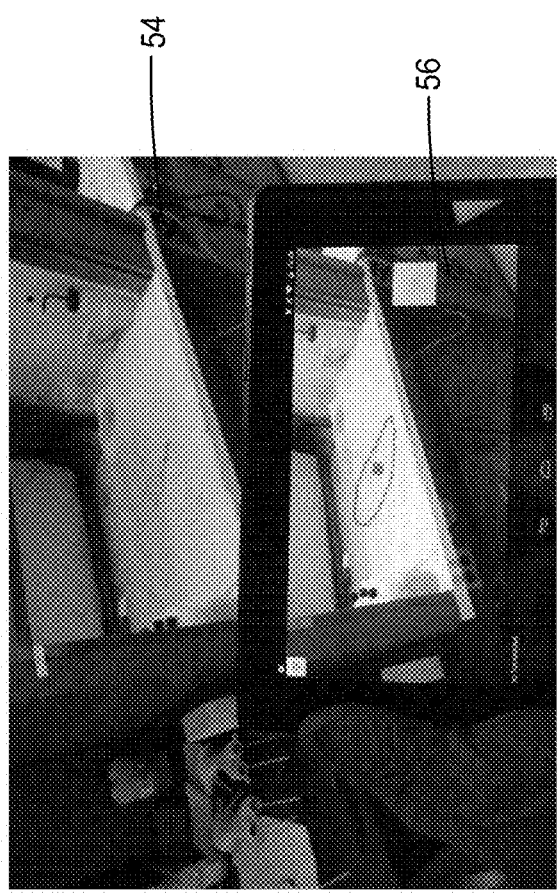
Figure 6:
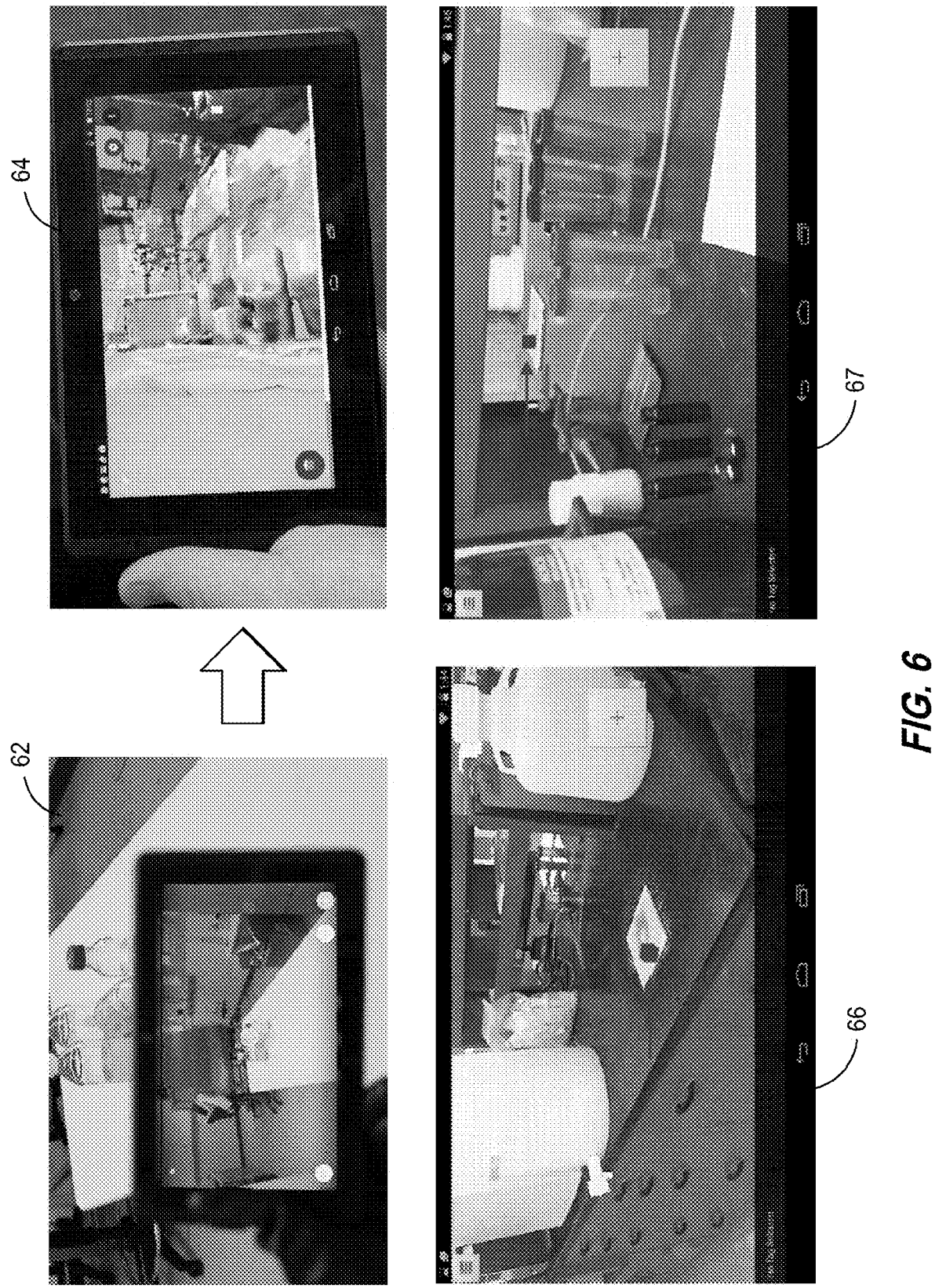
FIG. 6 depicts displays of tagged and augmented images according to an embodiment of the disclosure.

FIGS. 5 and 6, provide an example tagging scenario wherein a room is scanned in 52 and portions thereof tagged, and as shown, upon the augmentation of images captured within the room, the augmented image can be recalled to the video display upon viewing the tagged room, wherein the room exists at image 54 and the augmented image is shown in image 56. As is shown, the augmented image displays the existence of what could be considered a past CBRNE threat.

Referring to FIG. 6, another image 62 is taken processed and tagged in 64 and stored in storage media. When viewed in 66 from a very different viewpoint, augmented image is displayed and displays the CBRNE threat. From another view point shown in 67 the image recalled in image depicts another augmented image and shown to the viewer in real-time.

Referring next to FIGS. 7 and 8, imagery can be 3D mapped as shown and described herein, and this 3D mapped image can be stored as an augmented image in the storage media and recalled at a later point. For example, with reference to FIG. 8(A), an image can be 3D mapped when it passes through a set of cameras (B) to give a 3D mapped image (C). In accordance with example implementations, this 3D mapped image upon the detection of a CBRNE threat, can have the location of the CBRNE threat augmented on a portion of the 3D image.

Figure 9A:
FIGS. 9A and 9B are an actual and a processed image according to an embodiment of the disclosure.
Figure 9B:
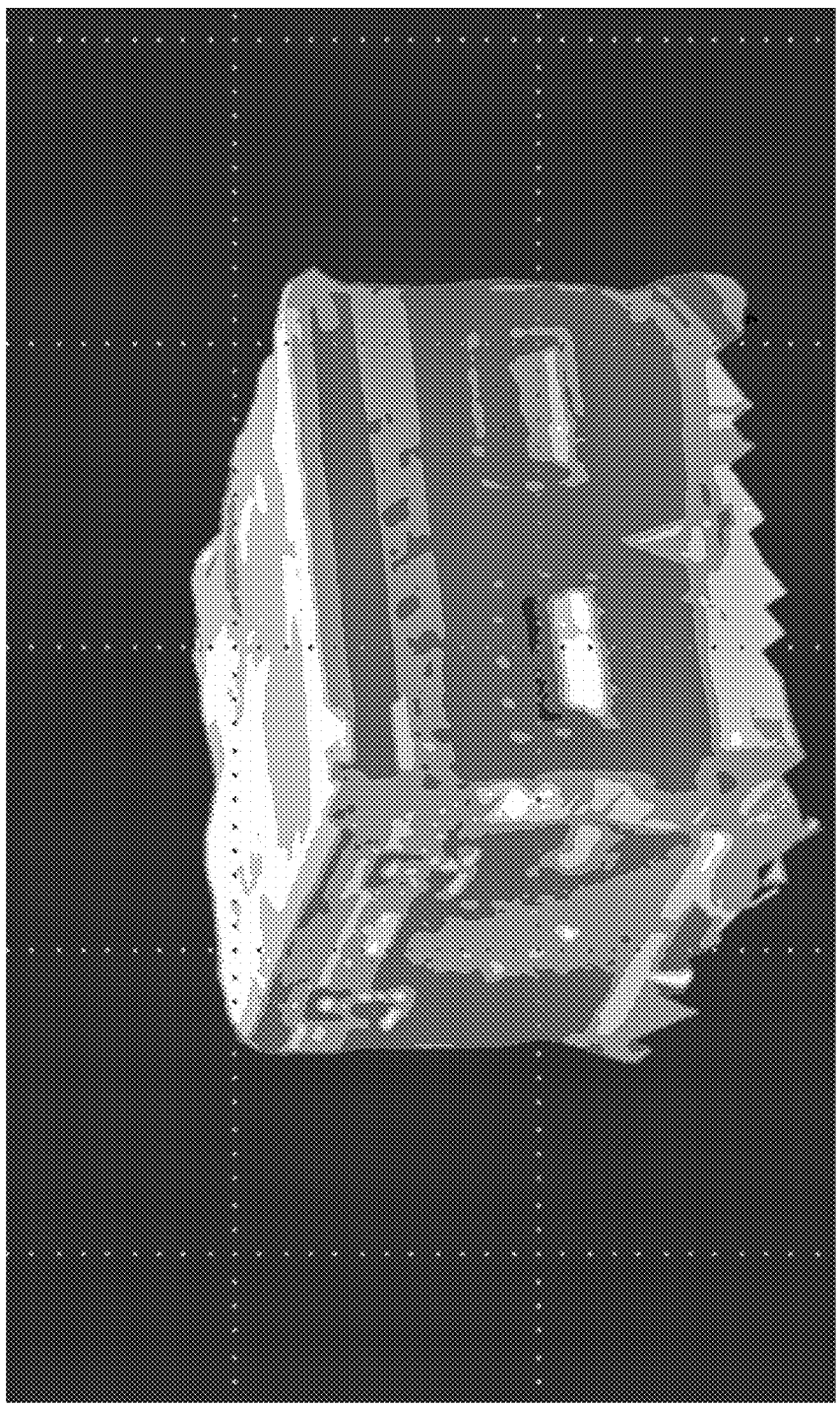

In accordance with other examples and with reference to FIGS. 9 and 10, actual and processed images are shown to demonstrate the creation of 3D models. The 3D models of these images can be prepared using a stereo camera such as FLIR's Brickstream® BPC 2500 Stereo Camera (www.flir.com/brickstream; Wilsonville, Oreg.). Accordingly, depth sensing and 3D model generation can be achieved under a wider range of real-world environments (no interference from sunlight) than an IR-based smartphone for example. Referring first to FIGS. 9A and 9B as well as table 1 below, an image of a box is captured and shown in FIG. 9A. This image is then processed using a stereo camera to provide a 3D image of the 2D box image. A comparison of the model box and generated images are shown in Table 1 below.

TABLE 1

Comparison of actual dimensions with 3D generated dimensions (FIGS. 9A and 9B)

| Dimension Description | Actual (cm) | Gen. 1 (cm) | Gen. 2 (cm) | Gen. 3 (cm) |
|---|---|---|---|---|
| A-Depth (inner margins) | 44 | 44 | 42 | 45 |
| B-height | 33 | 33 | 31 | 34 |
| C-width | 51 | 51 | 52 | 50 |

Referring next to FIGS. 10A-10D, multiple 2D images (10A-10C) are processed to prepare a 3D image (10D). Comparison of image actual dimensions to generated dimensions are shown in Table 2 below

TABLE 2

Comparison of actual dimensions with 3D generated dimensions (FIGS. 10A-D)

| Dimension Description | Actual (cm) | 3D Generated (cm) |
|---|---|---|
| A-distance between wheels | 260 | 260 |
| B-height 1 | 116 | 113 |
| C-height 2 | 141 | 139 |
| D-width | 119 | 105 |

In accordance with example implementations, this stereo camera processing can be combined with Real-Time Appearance-Based Mapping (RTABMAP) processing available as part of Robot Operating Systems (ROS, open source https://www.ros.org/) to prepare the SLAM model generation supplemented with color recognition to provide detection signal augmentation capabilities with a smartphone as shown herein.

Referring next to FIG. 11, a protocol for detecting the presence of a CBRNE threat using an image acquisition device in combination with processing circuitry or storage media as described in the systems of 10, 20, 30 and 40, is shown. In accordance with example implementations, a room can be scanned 96 during an initialization 92 using an image capturing device and saving the room Area Description File (ADF) to a file 98 in storage media, for example, using processing circuitry. From initialization to processing in 94 can be loading the ADF room file 100. Upon loading the ADF room file, processing can commence with capturing video 102 and making a red image mask of the video 104 defining segmentation threshold 106. Segmentation threshold 106 will be described with reference to FIGS. 13-17, for example, and then determining the presence or absence of valid segments, where valid segments are not determined, a return to capturing video 102, where they are determined, proceed to apply object filters 110 and then generating alternative augmented reality tag 112 and saving tag with room file 114.

In accordance with example implementations, a more detailed processing depiction is shown that includes images with representation of FIG. 12 that is consistent with the processing step 94 of FIG. 11. As can be seen in FIG. 12, the input frame can be in RGB-HSV-YUV-YCbCr-Lab etc. The initial processing step can include transforming a 3-channel color image into a monochrome normalized red image matrix with the values within the matrix being represented by values between 0 and 1 (or between 0 and 255 to visualize the values). In certain cases, the more red a certain pixel has, the closer to 1 the value will be, and if there is no red color at all, it should have a value of 0. This can form a signal rather than noise determination as is used in typical detection. The adaptive segmentation threshold is then defined so that the matrix can be segmented into objects that can be referred to as blobs. With this threshold in mind, the image can be constructed into objects or blobs i.e., with red pixels with clusters into blobs. Then certain filters are applied on the obtained blobs. The color filters such as brightness, redness, size filters, shape filters can be applied. In the final step, an output image is generated that includes a list of obtained objects or regions that are colored red, and those objects can be monitored over time to see changes.

Referring next to FIGS. 13-14, more depictions of the conversion of stored imagery into segmented imagery and then finally the formation of blobs are shown. For example, Clear UV-ADS; Additive UV-ADS; and/or Clear NIR-ADS samples were prepared and processed. As can be seen, the processed images provided a much clearer indication of the agent threat.

As can be seen in FIG. 14, sections of objects were treated and the imagery processed to shown multiple color depictions during image masking and segmentation to form blobs.

Referring particularly to FIG. 15, the image device 130 can be used to detect the presence of a CBRNE threat through segmentation of images captured by the device. In accordance with example implementations, device 130 can be coupled to or the data associated with another detection method. In this case, for example, ion mobility spectrometer 134 data can be acquired and processed to give an additional level of detection that can be combined with the data received by apparatus 130.

As can be seen in more detail in FIGS. 16 and 17, the color difference (shown as 132 in FIG. 15) is graphed showing the color difference between the visible ADS white image and the monochrome camera masked image. This difference can be considered the difference between detecting or not detecting a CBRNE threat.

Referring next to FIG. 18, in accordance with an example implementation, system 160 is shown. System 160 can include data acquisition component 162 operatively coupled to processing circuitry 164 and storage media 166, which is operatively coupled to display 168. In accordance with example implementations, data acquisition component 162 can include both an analytical instrument 170 and image acquisition device 172. In accordance with example implementations, the image acquisition device is as described herein, and the analytical instrument can be as described herein as well, such as, for example, CBRNE detector networking mapping instrumentation. In accordance with example implementations, analytical instrument 170 and image acquisition device 172 as well as display 168 and processing circuitry 164 and storage media 166 can all be part of the same device. In accordance with alternative embodiments, these components can be part of separate devices that are connected wirelessly or through a network, for example.

Referring next to FIG. 19, in a more detailed view, personnel 180 can be equipped with one or more of analytical instrumentation 170 which may be used to acquire data and display same at 168 using, for example, heads-up displays and/or augmented reality displays, and these displays can include the displays shown in 182. As described herein, these displays can be augmented to demonstrate the location of a CBRNE threat. The displays and instrumentation can be coupled to processing circuitry and/or storage media 164/166. As can be seen, displays 182 can be augmented to display CBRNE threats and/or 3-dimensional imagery for example.

Referring next to FIG. 20, a device 185 can have an additional analytical device 186 such as an ion mobility spectrometer integrated therein that may be coupled to a reading device, that may be removably coupled to device 185 and processed using separate processing circuitry 187. In accordance with example implementations, data 188 can be taken from an image 189 to identify a CBRNE threat, for example, utilizing the methods and processes described herein.

Referring next to FIG. 21, a system 190 is shown, and this system can include the method of detecting, confirming, documenting, recalling, and acting upon a CBRNE threat. The detection has been described herein, and the confirmation has been through orthogonal confirmation as described herein with both video display as well as additional physical data such as CBRNE threat detection via ion mass spectrometry, for example. The CBRNE threat can be documented and stored as described herein, wherein the CBRNE threat is part of a tagged image and/or an augmented image, and then the CBRNE threat can be recalled via a video heads-up display to show the operator the presence of the CBRNE threat when viewing real-time imagery. In accordance with example implementations and with reference to confirmation, FIGS. 22-23 are provided.

Referring to FIG. 22, a room can be entered at 202 by an operator handling a device that has one of the systems described herein. An initial scan of the room can be taken at 204, and then utilizing the processing circuitry, a 3D mesh can be generated of the background and stored in storage 206. This 3D mesh is not seen by the user.

Referring next to FIG. 23, the methods of 90 in FIG. 11 and FIG. 12 can be applied to provide a box 209 around a CBRNE threat area in view 210, and this box can be viewed as an augmented image in real-time. Referring next to FIG. 24, as shown in views 212, 214, 216 and 218, the box 209 is tagged and remains there as an augmented image upon real-time display, even when viewed from other angles, as shown in the multiple angles of 212, 214, 216, and 218. Referring next to FIG. 25, the location 209 of the box is bound not only to the image, but to the 3D mesh that was created of the image, and this can allow users to see where contamination was, even after cleanup or signal fading.

In accordance with yet another example and with reference to FIGS. 26-27, color detection and SLAM can be performed using a smartphone (Lenovo Phab 2 Pro) having area learning capability. With reference to FIGS. 26A and 26B capturing images is shown and the captured image of a material exposed to a disclosure spray. Accordingly, device 230 can be used to prepare an image of material 232 treated with ADS and disclosing detected material 234. In this case detection of a red positive signal 234 is initiated by pressing the Search button on the right of the device screen.

Referring to FIGS. 27A and 27B, capturing augmented images and the augmented image is shown with augmentation 236. This augmentation using SLAM can be seen over live video and remains associated with the detected location with movement of the material outside and returning to camera view as well as when the camera is aimed away from the material and then back again. Augmentation 236 will also stay in place after removal of detected material 234. This can provide true confidence when detecting and removing the very dangerous agents detected using ADS as the using can return to the actual location of detection after the indicator has been removed with the detected material.

Referring next to FIGS. 28-31, multiple examples of the augmented reality threat display are depicted, and this augmented threat display can be facilitated through a smartphone app, for example, and the threat location can be pinned by GPS location, thereby giving it another association with a location as described herein. It is contemplated that the display can be a graphical user interface, which would allow for the user to tap on the symbol to provide range, bearing, and status of the threat as well. Referring to FIG. 29, an overall system can provide an event notification to a network and an app platform can be apprised of this notification and augmented reality imaging can be used to view the threat in real-time. Referring to FIG. 30, in an additional application, IEDs can be mapped utilizing these systems by pulling in data from multiple network users and then transferring this data to smartphone apps and providing augmented reality to those viewing the area through displays that are on the network system.

Referring to FIG. 31, the augmented reality can be recalled for CBRNE threat mitigation. In accordance with an example implementation, a warfighter can be using a video display that can be a part of the systems and methods of the present disclosure that can recall augmented reality that is related to a tagged vehicle, for example, and this tagged vehicle may have a CBRNE threat that has been detected, and upon viewing this tagged vehicle, the augmented reality will display a box or notify of a CBRNE threat, for example. This data would be provided to all users connected to the system and allow the user to see contamination in real-time, even after signal fades at any angle, and any lighting condition.

Mitigation can take place, for example, with reference to FIG. 32. In accordance with example implementations, items that may be exposed to CBRNE threats routinely undergo decontamination. These items can include vehicles, for example, such as armored vehicles and/or planes. Mitigation typically takes place present day by an operator cleaning the vehicle in a tented area. The present disclosure provides for the automation of this mitigation, wherein image acquisition devices and processing circuitry and storage media are utilized to both determine the presence of a CBRNE threat and manipulate robotic or automatic cleaning systems to remove the CBRNE threat. For example, once a CBRNE threat is recognized on a Humvee, the Humvee is tagged, 3D mapped, and the CBRNE threat marked on the Humvee. The Humvee can then proceed to a tented area or enclosed area with an automated or robotic cleaning system and the CBRNE threat removed by the system directing the automated cleaning system to the CBRNE threat.

Additionally, with reference to FIGS. 33 and 34, a network can be provided wherein a historical library of CBRNE threats as well as IEDs or any kind of threat is mapped. Access to the network can be obtained, and individuals allowed to access the network using video displays, augmented reality, or other parts of data systems. These can be useful for the warfighter and/or the first responder, for example.

In addition to the applications mentioned above, an additional application of the innovation includes being used as a clearance/verification tool and recall previously contaminated vehicles, rooms (enter/exit clearance), and personal protective equipment to provide contamination location and decontamination assurance.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect. The invention is, therefore, claimed in any of its forms or modifications within the proper scope of the appended claims appropriately interpreted in accordance with the doctrine of equivalents.

The invention claimed is:

1. A system for identifying threat materials and locations, the system comprising:
   at least one image acquisition device configured to determine a presence of a threat material disposed at a location on an exterior surface of an object;
   image storage media; and
   processing circuitry operatively coupled to the at least one image acquisition device and the image storage media, wherein the processing circuitry is configured to:
      capture an image of the exterior surface of the object using the image acquisition device to provide a captured image,
      define an image mask of the captured image,
      define a segmentation threshold based on the image mask,
      detect a valid segment in the captured image based on the segmentation threshold to provide a detected valid segment,
      generate an augmented reality tag based on the detected valid segment,
      associate the augmented reality tag with a three-dimensional model of the area, and
      display at least a portion of the three-dimensional model on a display device and indicating the location of the detected threat material on the exterior surface of the object based on the augmented reality tag.

2. The system of claim 1, wherein the at least one image acquisition device comprises one or more of a chemical, biological, radiological, explosives, drugs, and/or narcotics detector.

3. The system of claim 1, wherein the at least one image acquisition device is configured as a disclosure spray detector.

4. The system of claim 3, wherein the image acquisition device comprises a portable video recording device.

5. A method for identifying a threat material, the method comprising:
   detecting a presence of a threat material disposed at a location on an exterior surface of an object in an area using an image acquisition device, the detecting the presence of the threat material comprising
      capturing an image of the exterior surface of the object using an image acquisition device to provide a captured image,
      defining an image mask of the captured image,
      defining a segmentation threshold based on the image mask,
      detecting a valid segment in the captured image based on the segmentation threshold to provide a detected valid segment,
      generating an augmented reality tag based on the detected valid segment, and
      associating the augmented reality tag with a three-dimensional model of the area; and
   displaying at least a portion of the three-dimensional model on a display device and indicating the location of the detected threat material on the exterior surface of the object based on the augmented reality tag.

6. The method of claim 5, wherein the threat material is a chemical threat and the determining the presence of the chemical threat further comprises mass analysis.

7. The method of claim 5, wherein the threat material is a chemical threat and the determining the presence of the chemical threat further comprises disclosure spray analysis.

8. The method of claim 5, wherein the capturing the image of the exterior surface of the object comprises scanning a field.

9. The method of claim 8, further comprising associating the augmented reality tag with the field.

10. The method of claim 8, wherein the field comprises a room.

11. The method of claim 5, wherein the indicating the location of the detected threat material on the exterior surface of the object based on the augmented reality tag comprises displaying a color masking of at least a portion of the image on the three-dimensional model.

12. The method of claim 5, further comprising indicating a range, a bearing, a status, and/or a type of the detected threat material on the exterior surface of the object.

13. The method of claim 5, wherein the three-dimensional model is generated by at least two different image acquisition devices.

14. The method of claim 5, further comprising automatically removing the threat material using a robotic or automatic cleaning system.

15. The method of claim 5, wherein the image acquisition device comprises a portable video recording device.

16. The method of claim 5, wherein the threat material is a chemical threat, a biological threat, a radiological threat, an explosive threat, a drug threat, and/or a narcotic threat.

17. The method of claim 5, wherein the display device comprises a wearable device.

18. The method of claim 17, wherein the wearable device comprises a heads-up display, a monocular device, a handheld device, or a spatial augmented reality device.

19. The method of claim 5, wherein the image is a portion of a video.

20. A method for augmenting a real-time display to include a location of a threat material, the method comprising:
   detecting a presence of a threat material on an exterior surface of an object in an area using an analytical instrument configured to detect at least one of a chemical threat, a biological threat, a radiological threat, an explosive threat, a drug threat, and/or a narcotic threat;
   determining a location of the analytical instrument when the threat material was detected using at least one of a global positioning system (GPS) and light detection and ranging (LIDAR);
   generating an augmented reality tag based on the detected presence of the threat material and the location of the analytical instrument when the threat material was detected;
   associating the augmented reality tag with a three-dimensional model of the area; and
   displaying at least a portion of the three-dimensional model on a real-time display device and indicating the location of the detected threat material on the exterior surface of the object based on the augmented reality tag;
   wherein the location of the analytical instrument is in relation to the object; and
   wherein the object is moved to a different location in the area, and displaying at least a second portion of the three-dimensional model on the real-time display device and indicating the location of the detected threat material on the exterior surface of the object based on the augmented reality tag based on the location of the analytical object in relation to the object.

21. The method of claim 20, wherein the location of the analytical instrument is a geolocation of the analytical instrument.

22. The method of claim 20, further comprising automatically removing the threat material using a robotic or automatic cleaning system.

23. The method of claim 20, wherein the real-time display device comprises a wearable device.

24. The method of claim 23, wherein the wearable device comprises a heads-up display, a monocular device, a handheld device, or a spatial augmented reality device.

25. The method of claim 20, wherein the determining the location of the analytical instrument when the threat material was detected is performed using GPS.

26. The method of claim 20, wherein the determining the location of the analytical instrument when the threat material was detected is performed using LIDAR.

27. The method of claim 20, further comprising determining a time when the threat material was detected, and wherein the generating the augmented reality tag is based on the detected presence of the threat material, the location of the analytical instrument when the threat material was detected, and the time when the threat material was detected.

28. The method of claim 20, wherein the indicating the location of the detected threat material on the exterior surface of the object based on the augmented reality tag comprises simultaneous localization and mapping.

* * * * *